US008599404B2

(12) United States Patent
Kobayashi et al.

(10) Patent No.: US 8,599,404 B2
(45) Date of Patent: Dec. 3, 2013

(54) NETWORK IMAGE PROCESSING SYSTEM, NETWORK IMAGE PROCESSING APPARATUS, AND NETWORK IMAGE PROCESSING METHOD

(75) Inventors: Minako Kobayashi, Ikeda (JP);
Hironobu Nakata, Itami (JP);
Masakazu Murakami, Itami (JP);
Kazumi Sawayanagi, Itami (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1295 days.

(21) Appl. No.: 11/259,317

(22) Filed: Oct. 27, 2005

(65) Prior Publication Data
US 2006/0274361 A1 Dec. 7, 2006

(30) Foreign Application Priority Data

Jun. 3, 2005 (JP) ................................. 2005-164633

(51) Int. Cl.
*G06F 3/12* (2006.01)
(52) U.S. Cl.
USPC ....................................................... 358/1.15
(58) Field of Classification Search
USPC ......................................... 358/1.15, 1.13, 1.1
See application file for complete search history.

(56) References Cited

U.S. PATENT DOCUMENTS

| 6,104,468 | A | 8/2000 | Bryniarski et al. | |
| 6,493,675 | B1 | 12/2002 | Kanaya et al. | |
| 2002/0094089 | A1* | 7/2002 | Kamiya et al. | 380/279 |
| 2004/0187022 | A1* | 9/2004 | Asada et al. | 713/200 |
| 2004/0193465 | A1* | 9/2004 | Sangroniz et al. | 705/8 |
| 2004/0193717 | A1 | 9/2004 | Tajima et al. | |
| 2005/0027825 | A1 | 2/2005 | Hikawa et al. | |
| 2005/0050466 | A1* | 3/2005 | Sangroniz et al. | 715/526 |
| 2005/0141013 | A1* | 6/2005 | Kikuchi et al. | 358/1.14 |

FOREIGN PATENT DOCUMENTS

| JP | 11-213082 A | 8/1999 |
| JP | 2000-049990 | 2/2000 |
| JP | 2000-172463 A | 6/2000 |
| JP | 2001-249792 | 9/2001 |
| JP | 2002-099510 A | 4/2002 |
| JP | 2003-233473 | 8/2003 |
| JP | 2003-345954 | 12/2003 |

(Continued)

OTHER PUBLICATIONS

Official Action issued by the Japanese Patent Office in Japanese priority application No. 2005-164633, Sep. 25, 2007; and Verified English-language translation thereof.

*Primary Examiner* — Jeremiah A Bryar
(74) *Attorney, Agent, or Firm* — Buchanan Ingersoll & Rooney PC

(57) ABSTRACT

A network image processing system that includes a plurality of apparatuses connected to a network and performs jobs in a linkage process in which an upstream apparatus passes a workflow specifying a job to be completed, together with image data to be processed, to a downstream apparatus according to a procedure specified in the workflow. The downstream apparatus has a completion notification transmitting unit that when a predetermined job assigned to the downstream apparatus has been processed completely, transmits to the upstream apparatus a completion notification indicating that the predetermined job has been processed normally. The upstream apparatus has a linkage unit that if the completion notification is not received from the downstream apparatus, updates the workflow to specify, as a new downstream apparatus, another apparatus that can process the predetermined job, and continues to process the predetermined job in the linkage process.

25 Claims, 12 Drawing Sheets

(56) References Cited

FOREIGN PATENT DOCUMENTS

| JP | 2004-164570 | * | 10/2004 |
| JP | 2004-280665 | | 10/2004 |
| JP | 2004-287861 | | 10/2004 |
| JP | 2004-287862 | | 10/2004 |
| JP | 2005-025578 A | | 1/2005 |

* cited by examiner

NETWORK IMAGE PROCESSING SYSTEM, NETWORK IMAGE PROCESSING APPARATUS, AND NETWORK IMAGE PROCESSING METHOD

This application is based on an application No. 2005-164633 filed on Jun. 3, 2005 in Japan, the contents of which is hereby incorporated by reference.

BACKGROUND OF THE INVENTION (1) Field of the Invention

The present invention relates to a network image processing system for performing a job in a linkage process in which a plurality of apparatuses connected to a network perform a job in corporation in accordance with a common workflow, and in particular relates to a technology for improving convenience in case of error occurrence.

(2) Description of the Related Art

A workflow system is a system in which a plurality of apparatuses, such as an MFP (Multifunction Peripheral), a network terminal, a server and the like, achieve a workflow in corporation.

The workflow system performs a sequence of processes of scanning a document, processing data obtained by scanning the document, and distributing the processed data, automatically in cooperation in accordance with a procedure that has been defined in advance. This improves the operating efficiency since the operator need not operate for each of the plurality of processes.

Such a conventional workflow system is useful in so far as the procedure proceeds without an error. However, if an error occurs, the operating efficiency may turn out to be worse than normal since the procedure should be repeated from the beginning.

In consideration of the above-mentioned problem, Japanese Laid-Open Patent Application No. 2004-280665 discloses a workflow system that defines in advance, in a workflow, an optimum error handling process in units of services or jobs. The document states that the technology can improve the operating efficiency since with this construction, a most appropriate error handling process is performed in case an error occurs.

However, the conventional workflow system does not pay much attention to the means for continuing the linkage process if an error occurs.

SUMMARY OF THE INVENTION

The object of the present invention is therefore to provide a network image processing system, a network image processing apparatus, and a network image processing method that continue to perform a job in the linkage process in accordance with a workflow even if an error occurs.

The above object is fulfilled by a network image processing system, including a plurality of apparatuses connected to a network, for performing jobs in a linkage process in which an upstream apparatus passes a workflow specifying a job to be completed, together with image data to be processed, to a downstream apparatus according to a procedure specified in the workflow, wherein the downstream apparatus comprises a completion notification transmitting unit that when a predetermined job assigned to the downstream apparatus has been processed completely, transmits to the upstream apparatus a completion notification indicating that the predetermined job has been processed normally, and the upstream apparatus comprises a linkage unit that if the completion notification is not received from the downstream apparatus, updates the workflow to specify, as a new downstream apparatus, another apparatus among the plurality of apparatuses that is able to process the predetermined job, and continues to process the predetermined job in the linkage process.

The above object is also fulfilled by a network image processing system for performing a job in a linkage process in which image data to be processed by the job and an identification of a workflow, which specifies the job and a procedure for the job, are passed from an upstream apparatus to a downstream apparatus among a plurality of apparatuses connected to a network, in accordance with the procedure specified by the workflow as the job is performed by the upstream apparatus and the downstream apparatus, each of the plurality of apparatuses prestoring therein a workflow, wherein the downstream apparatus comprises a completion notification transmitting unit that when a predetermined job assigned to the downstream apparatus has been processed completely, transmits to the upstream apparatus a completion notification indicating that the predetermined job has been processed normally, and the upstream apparatus comprises a linkage unit that if the completion notification is not received from the downstream apparatus, updates workflows stored in all downstream apparatuses to specify, as a new downstream apparatus, another apparatus among the plurality of apparatuses connected to the network that can process the predetermined job, and continues to process the predetermined job in the linkage process.

The above object is also fulfilled by a network image processing system composed of a plurality of apparatuses for performing predetermined jobs in a linkage process in accordance with a workflow that specifies the predetermined jobs and a procedure for the predetermined jobs, comprising: a management unit that monitors each job in terms of normal completion thereof, and judges whether there is a job that has not been completed normally; an assignment unit that if the management unit judges that there is a job that has not been completed normally, assigns the job to an image processing apparatus that can perform the job; and a control unit that continues the linkage process in accordance with the workflow by causing the image processing apparatus to perform the job.

The above object is also fulfilled by a network image processing apparatus included in a network image processing system that includes a plurality of apparatuses connected to a network and performs jobs in a linkage process in which an upstream apparatus passes a workflow specifying a job to be completed, together with image data to be processed, to a downstream apparatus according to a procedure specified in the workflow, the network image processing apparatus comprising: a completion notification transmitting unit that when a predetermined job assigned to the network image processing apparatus has been processed completely, transmits, to an apparatus that is upstream of the network image processing apparatus by one, a completion notification indicating that the predetermined job has been processed normally; and a linkage unit that if a completion notification is not received from an apparatus that is downstream of the network image processing apparatus by one, in terms of another predetermined job that is specified by a workflow that is passed from the apparatus that is upstream of the network image processing apparatus by one, updates the workflow to specify, as a new downstream apparatus, another apparatus among the plurality of apparatuses connected to the network that can process said another predetermined job, and continues to process the predetermined job in the linkage process.

The above object is also fulfilled by a network image processing apparatus included in a network image processing system for performing a job in a linkage process in which image data to be processed by the job and an identification of a workflow, which specifies the job and a procedure for the job, are passed from an upstream apparatus to a downstream apparatus among a plurality of apparatuses connected to a network, in accordance with the procedure specified by the workflow as the job is performed by the upstream apparatus and the downstream apparatus, each of the plurality of apparatuses prestoring therein a workflow, the network image processing apparatus comprising: a completion notification transmitting unit that when a predetermined job assigned to the network image processing apparatus has been processed completely, transmits, to an apparatus that is upstream of the network image processing apparatus by one, a completion notification indicating that the predetermined job has been processed normally, and a linkage unit that if a completion notification is not received from an apparatus that is downstream of the network image processing apparatus by one, in terms of another predetermined job that is specified by a workflow with an identifier that is passed from the apparatus that is upstream of the network image processing apparatus by one, updates workflows stored in all downstream apparatuses to specify, as a new downstream apparatus, another apparatus among the plurality of apparatuses connected to the network that can process said another predetermined job, and continues to process the predetermined job in the linkage process.

The above object is also fulfilled by a network image processing apparatus included in a network image processing system for performing a linkage process based on a workflow that specifies predetermined jobs and a procedure for the predetermined jobs, the network image processing apparatus comprising: a management unit that monitors each job in terms of normal completion thereof, and judges whether there is a job that has not been completed normally; a control unit that if the management unit judges that there is a job that has not been completed normally, assigns the job to another network image processing apparatus that can perform the job, and continues the linkage process in accordance with the workflow.

The above object is also fulfilled by a network image processing method for a network image processing system that includes a plurality of apparatuses connected to a network and performs jobs in a linkage process in which an upstream apparatus passes a workflow specifying a job to be completed, together with image data to be processed, to a downstream apparatus according to a procedure specified in the workflow, the network image processing method comprising: a completion notification transmitting step that when a predetermined job assigned to the network image processing apparatus has been processed completely, transmits, to an apparatus that is upstream of the network image processing apparatus by one, a completion notification indicating that the predetermined job has been processed normally; and a linkage step that if a completion notification is not received from an apparatus that is downstream of the network image processing apparatus by one, in terms of another predetermined job that is specified by a workflow that is passed from the apparatus that is upstream of the network image processing apparatus by one, updates the workflow to specify, as a new downstream apparatus, another apparatus among the plurality of apparatuses connected to the network that can process said another predetermined job, and continues to process the predetermined job in the linkage process.

The above object is also fulfilled by a network image processing method for a network image processing system for performing a job in a linkage process in which image data to be processed by the job and an identification of a workflow, which specifies the job and a procedure for the job, are passed from an upstream apparatus to a downstream apparatus among a plurality of apparatuses connected to a network, in accordance with the procedure specified by the workflow as the job is performed by the upstream apparatus and the downstream apparatus, each of the plurality of apparatuses prestoring therein a workflow, the network image processing method comprising: a completion notification transmitting step that when a predetermined job assigned to the downstream apparatus has been processed completely, transmits, to an apparatus that is upstream of the downstream apparatus by one, a completion notification indicating that the predetermined job has been processed normally, and a linkage step that if a completion notification is not received from an apparatus that is downstream of the network image processing apparatus by one, in terms of another predetermined job that is specified by a workflow with an identifier that is passed from the apparatus that is upstream of the network image processing apparatus by one, updates workflows stored in all downstream apparatuses to specify, as a new downstream apparatus, another apparatus among the plurality of apparatuses connected to the network that can process said another predetermined job, and continues to process the predetermined job in the linkage process.

The above object is also fulfilled by a network image processing method for a network image processing system for performing a linkage process based on a workflow that specifies predetermined jobs and a procedure for the predetermined jobs, the network image processing method comprising: a management step that monitors each job in terms of normal completion thereof, and judges whether there is a job that has not been completed normally; a control step that if the management step judges that there is a job that has not been completed normally, assigns the job to another network image processing apparatus that can perform the job, and continues the linkage process in accordance with the workflow.

With any of the above-stated constructions, if an error occurs to a downstream apparatus, another apparatus is detected as a replacing downstream apparatus. This enables the linkage process to be continued to perform the jobs smoothly.

The constructions therefore improve the operating efficiency.

In the above-stated network image processing apparatus, if a completion notification is not received from the apparatus that is downstream of the network image processing apparatus by one, the linkage unit may search for an apparatus that can process said another predetermined job at a current point in time.

With the above-stated construction, if an error occurs to an apparatus, another apparatus that can perform the job assigned to the error apparatus at the point in time is searched. This reduces the possibility that the error occurs again, improving the operating efficiency.

In the above-stated network image processing apparatus, if a completion notification is not received from the apparatus that is downstream of the network image processing apparatus by one, the linkage unit may notify an apparatus that is downstream of the network image processing apparatus by two that the new downstream apparatus has justly succeeded said another predetermined job.

With the above-stated construction, during the error handling, an apparatus sends information regarding an apparatus that has succeeded the job, to an apparatus that is downstream of the present apparatus by two. This prevents the apparatus that is downstream of the present apparatus by two, from receiving a job from an unexpected apparatus.

In the above-stated network image processing apparatus, when notifying that the new downstream apparatus has justly succeeded said another predetermined job, the linkage unit may use encryption.

The above-stated construction prevents occurrence of an unauthenticated act such as a spoofing, thus improves the security level.

In the above-stated network image processing apparatus, if a completion notification is not received from the apparatus that is downstream of the network image processing apparatus by one, the linkage unit may continue the linkage process in a high secure mode that has a higher security level than a normal security level of a normal secure mode.

With the above-stated construction, an error handling process is performed with a higher security level than a normal security level. With such a construction a well-balanced security management is achieved, where the normal processes are performed at appropriate speeds with appropriate security levels, and although at a slightly slower speed, the error handling process is performed with a higher security level.

In the above-stated network image processing apparatus, in the high secure mode, encryption may be used in transmission and reception of data.

With the above-stated construction, if an error occurs, the data transmission/reception is performed using an encryption process. The processing speed is decreased as much as the time required for the encryption process, but instead the security level is increased, thus achieving a well-balanced security management.

In the above-stated network image processing apparatus, the linkage unit may further include: a key management unit that if a completion notification is not received from the apparatus that is downstream of the network image processing apparatus by one, distributes a common key to an apparatus that is downstream of the network image processing apparatus by two, and to the new downstream apparatus; an encryption unit that if a common key is distributed from the apparatus that is upstream of the network image processing apparatus by one, encrypts, using the common key, part or all of data that is to be transmitted to the apparatus that is downstream of the network image processing apparatus by one; and a decryption unit that if a common key is distributed from an apparatus that is upstream of the network image processing apparatus by two, and if encrypted data is received from an apparatus that can perform a job assigned to the apparatus that is upstream of the network image processing apparatus by one, decrypts the encrypted data using the common key.

In the above-stated The network image processing apparatus, the linkage unit may further include: a key management unit that if a job that has been assigned in advance or is newly assigned to the network image processing apparatus cannot be performed, generates a common key and distributes the common key to the apparatus that is upstream of the network image processing apparatus by one and to the apparatus that is downstream of the network image processing apparatus by one, and if a completion notification is not received from the apparatus that is downstream of the network image processing apparatus by one, is distributed a common key from the apparatus that is downstream of the network image processing apparatus by one, and transfers the distributed common key to the new downstream apparatus; an encryption unit that if a common key is distributed from the apparatus that is upstream of the network image processing apparatus by one, encrypts, using the common key, part or all of data that is to be transmitted to the apparatus that is downstream of the network image processing apparatus by one; and a decryption unit that if a common key is distributed from the apparatus that is upstream of the network image processing apparatus by one, and if encrypted data is received from an apparatus that can perform a job assigned to the apparatus that is upstream of the network image processing apparatus by one, decrypts the encrypted data using the common key.

In the above-stated network image processing apparatus, the linkage unit may further include: a key management unit that if a completion notification is not received from the apparatus that is downstream of the network image processing apparatus by one, is distributed an authentication decryption key from the new downstream apparatus, and transfers the authentication decryption key to an apparatus that is downstream of the network image processing apparatus by two; an encryption unit that if an authentication decryption key of the network image processing apparatus has been transmitted to the apparatus that is upstream of the network image processing apparatus by one, encrypts part or all of data that is to be transmitted to the apparatus that is downstream of the network image processing apparatus by one, using the authentication decryption key of the network image processing apparatus; and a decryption unit that if an authentication decryption key of an apparatus that can perform a job assigned to the apparatus that is upstream of the network image processing apparatus by one is distributed from an apparatus that is upstream of the network image processing apparatus by two, and if encrypted data, which was generated by encrypting data using the authentication decryption key of the apparatus that can perform the job, decrypts the encrypted data using the authentication decryption key.

With the above-stated constructions, if an error occurs, encrypted data received from an unexpected apparatus is decrypted using a key that has been received from an expected apparatus. And only if the decryption is successfully performed, the job is performed. Such a construction increases the security level in case of error occurrence and prevents occurrence of an unauthenticated act such as a spoofing, thus improves the security level efficiently.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

Embodiment 1

Outline

Embodiment 1 of the present invention relates to a network image processing system for performing a job in a linkage process in which image data to be processed by the job and a workflow, which specifies the job and a procedure for the job, are passed from an upstream apparatus to a downstream apparatus, and if an error occurs in a downstream apparatus, an apparatus that is upstream of the downstream apparatus by one detects an apparatus that can perform the job in place of the downstream apparatus, and continues to perform the job in the linkage process.

<Construction>

Figure 1:
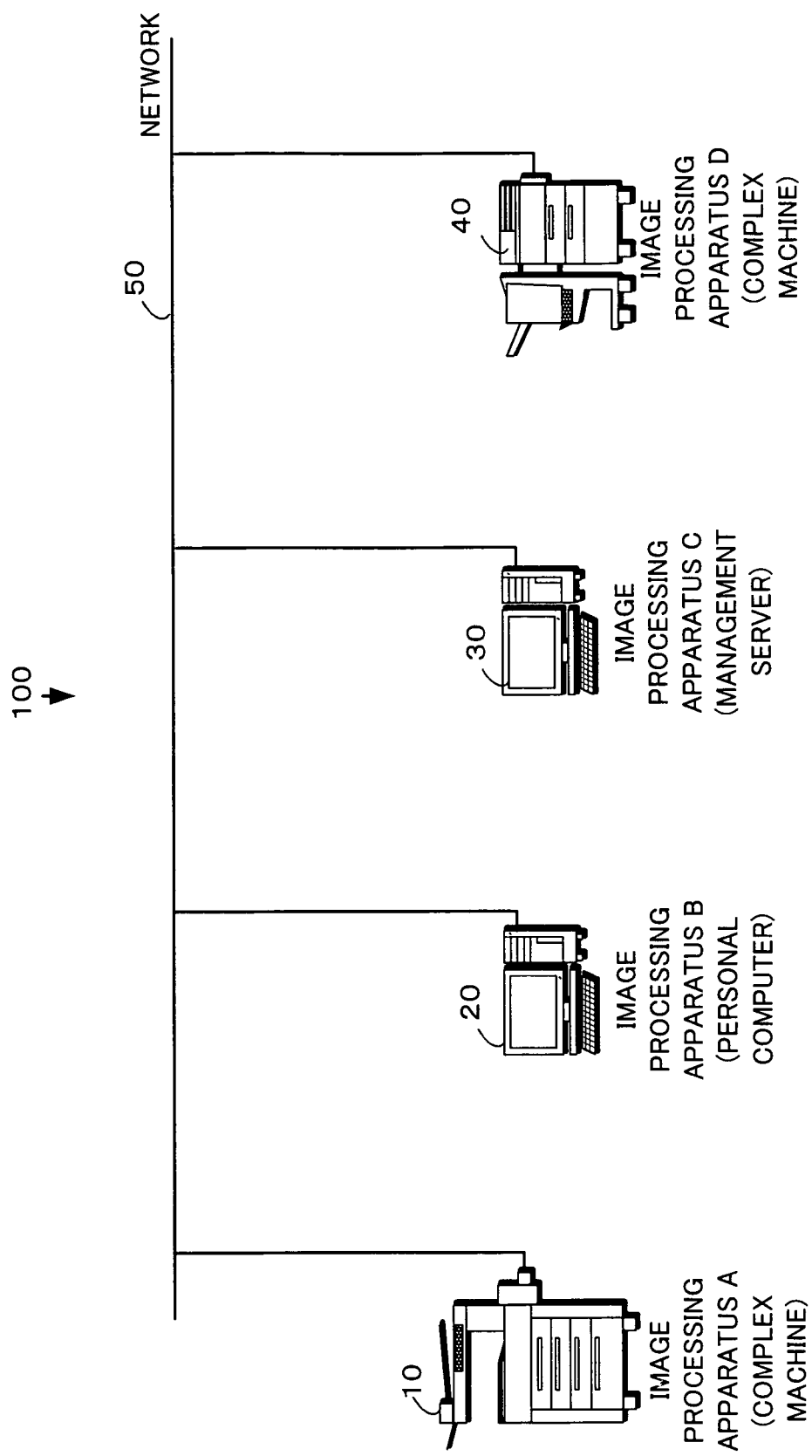
FIG. 1 shows an outline of a network image processing system in Embodiment 1 of the present invention.

FIG. 1 shows an outline of a network image processing system in Embodiment 1 of the present invention.

As shown in FIG. 1, a network image processing system 100 in Embodiment 1 of the present invention includes an image processing apparatus A 10, an image processing apparatus B 20, an image processing apparatus C 30, an image processing apparatus D 40, and a network 50 that connects these image processing apparatuses.

Figure 2:
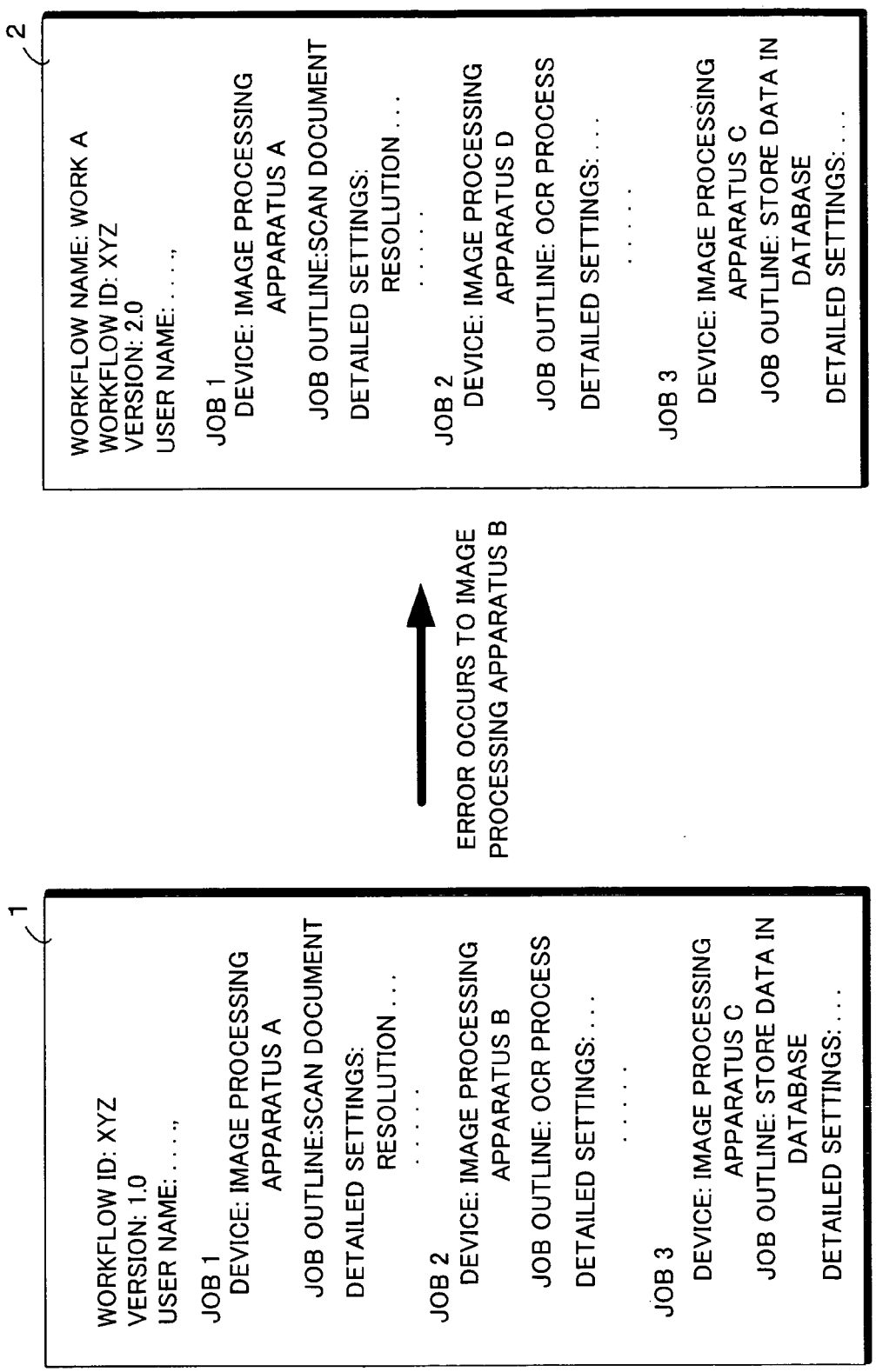
FIG. 2 shows examples of workflows that specify jobs to be executed by each apparatus and the procedures for the jobs.

FIG. 2 shows examples of workflows that specify jobs to be executed by each apparatus and the procedures for the jobs.

As shown in FIG. 2, a workflow 1 is used before an error occurs to the image processing apparatus B 20, and a workflow 2 is used after the error occurs and the image processing apparatus D 40 performs the process in place of the image processing apparatus B 20. Here, the workflow 1 indicates that the image processing apparatus A 10 scans a document, the image processing apparatus B 20 performs an OCR process onto image data, and the image processing apparatus C 30 stores data into a database. Also, the workflow 2 indicates that the image processing apparatus A 10 scans a document, the image processing apparatus D 40 performs an OCR process onto image data, and the image processing apparatus C 30 stores data into a database.

The image processing apparatus A 10 and the image processing apparatus D 40 are, for example, complex machines (each of which is provided with a plurality of functions of a plurality of apparatuses such as a scanner, a copying machine, and a printer). The image processing apparatus B 20 is, for example, a personal computer. The image processing apparatus C 30 is, for example, a management server. Each apparatus, upon receiving an instruction or an input of a predetermined file from the user, starts performing jobs in a linkage process in accordance with a workflow that is stored in the apparatus in advance, or receives image data and a workflow from another apparatus via the network and continues or ends the linkage process in accordance with the received workflow.

The image processing apparatus A 10 stores therein a workflow in advance, such as the one shown in FIG. 2. Upon receiving an instruction from the user, the image processing apparatus A 10 starts a linkage process with, for example, scanning a document in accordance with the workflow, and transmits obtained image data and the workflow to the image processing apparatus B 20 via the network 50.

The image processing apparatus B 20, for example, receives the image data and the workflow from the image processing apparatus A 10, performs the OCR process on the received image data in accordance with the received workflow, and transmits image data, which is a result of the OCR process, and the received workflow to the image processing apparatus C 30 via the network 50.

The image processing apparatus C 30, for example, receives the image data and the workflow from the image processing apparatus B 20, stores, in accordance with the received workflow, the received image data into a database it manages, and ends the linkage process.

It is presumed here that when an error occurs to the image processing apparatus B 20, the image processing apparatus D 40 performs the OCR process in place of the image processing apparatus B 20, and continues to perform the jobs in the linkage process.

Figure 3:
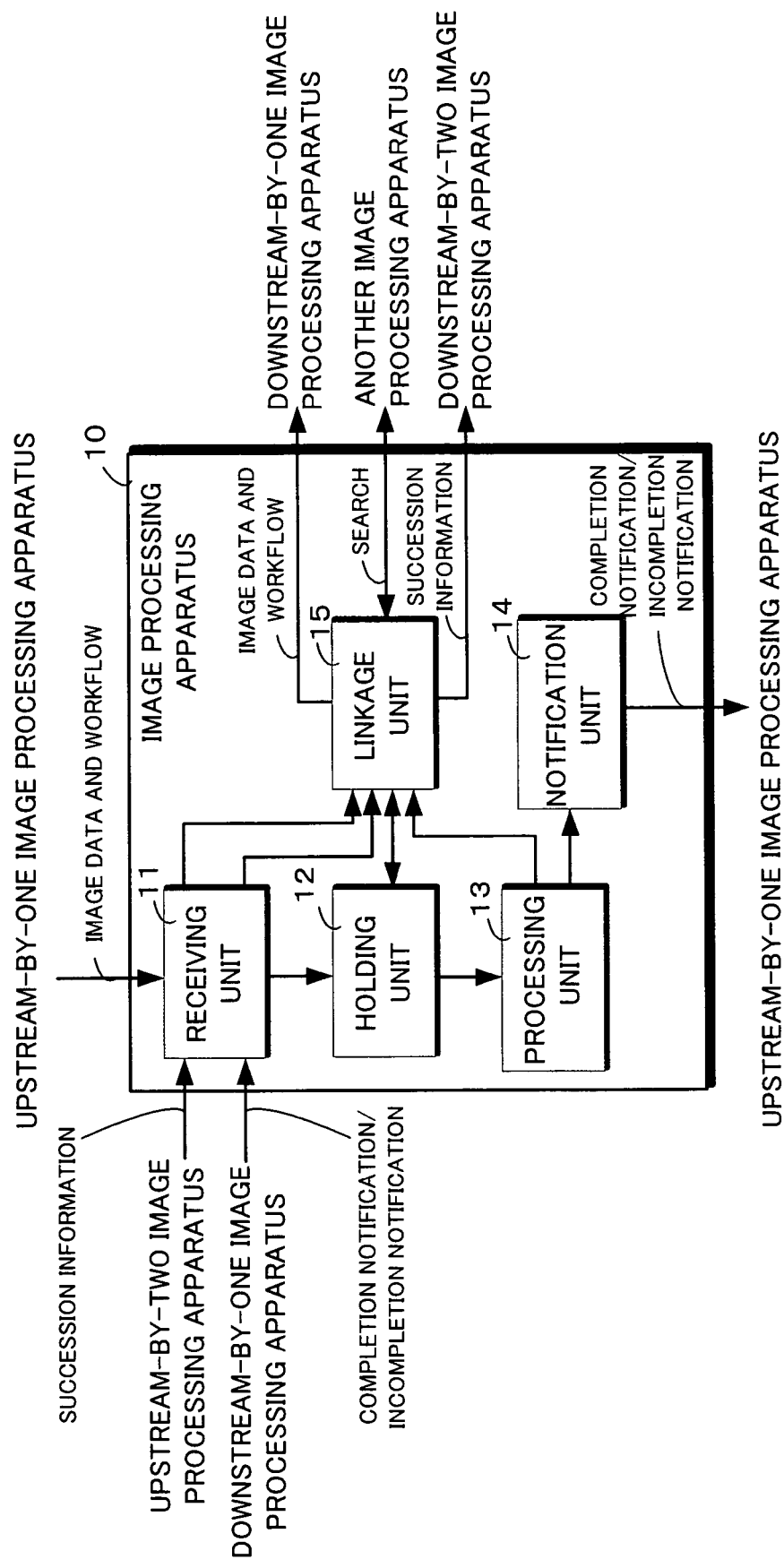
FIG. 3 shows the detailed construction of the image processing apparatus A 10.

FIG. 3 shows the detailed construction of the image processing apparatus A 10.

As shown in FIG. 3, the image processing apparatus A 10 includes a receiving unit 11, a holding unit 12, a processing unit 13, a notification unit 14, and a linkage unit 15.

The receiving unit 11 receives image data to be processed and a workflow via the network 50 from an image processing apparatus that is upstream of the present image processing apparatus by one, receives succession information from an image processing apparatus that is upstream of the present image processing apparatus by two, and receives a completion notification or an incompletion notification from an image processing apparatus that is downstream of the present image processing apparatus by one.

The holding unit 12 holds image data and a workflow, either in advance or after receiving them from another apparatus.

The processing unit 13 performs a job that is assigned to the present image processing apparatus, using the image data held by the holding unit 12 in accordance with the workflow held by the holding unit 12.

The notification unit 14 transmits via the network 50 to an image processing apparatus that is upstream of the present image processing apparatus by one, a completion notification that indicates that a job has been completed normally; and transmits an incompletion notification that indicates a job has not been completed normally.

The linkage unit 15, upon completion of a job of the present image processing apparatus, transmits, based on a received workflow, the workflow and image data, which is a result of the job, to an image processing apparatus that is downstream of the present image processing apparatus by one. When the receiving unit 11 receives a completion notification from an image processing apparatus that is downstream of the present image processing apparatus by one, the linkage unit 15 ends the linkage process in terms of the present image processing apparatus. If the receiving unit 11 receives an incompletion notification, or does not receive a completion notification for a predetermined time period (hereinafter, this is merely referred to as "does not receive a completion notification"), the linkage unit 15 updates a workflow so that it specifies another apparatus that can process the job that has been assigned to the downstream-by-one image processing apparatus, as a new downstream image processing apparatus. In the present example, the linkage unit 15 searches among the image processing apparatuses that are connected to the network 50 for an apparatus that can process the job that is currently assigned to the downstream-by-one image processing apparatus, and determines the apparatus detected by the search to be a new downstream image processing apparatus. The linkage unit 15 sends succession information, which indicates that a new downstream apparatus has justly succeeded a job, specifying the new downstream apparatus and the workflow, to an image processing apparatus that is downstream of the present image processing apparatus by two. Also, if the receiving unit 11 receives succession information, the linkage unit 15 judges whether or not a workflow specified by the succession information has been received from an image processing apparatus that is specified by the succession information. If it judges negatively, the linkage unit 15 prohibits the specified job from being performed in the linkage process in accordance with the workflow. This is because there is high possibility that the apparatus is an unauthorized one.

It should be noted here that if the linkage unit 15 does not receive a completion notification from a downstream-by-one image processing apparatus, the job assigned to the apparatus may be continued to be performed in the linkage process in the high secure mode that has a higher security level than a normal security level such that the job is performed with a higher security level than a normal security level. In the high secure mode, for example, encryption may be used in transmitting or receiving image data, a workflow, succession information or the like.

The image processing apparatus B 20 includes a receiving unit 21, a holding unit 22, a processing unit 23, a notification unit 24, and a linkage unit 25. These components of the image processing apparatus B 20 are the same as those with the same names of the image processing apparatus A 10, and the description thereof is omitted here.

The image processing apparatus C 30 includes a receiving unit 31, a holding unit 32, a processing unit 33, a notification unit 34, and a linkage unit 35. These components of the image processing apparatus C 30 are the same as those with the same names of the image processing apparatus A 10, and the description thereof is omitted here.

The image processing apparatus D 40 includes a receiving unit 41, a holding unit 42, a processing unit 43, a notification unit 44, and a linkage unit 45. These components of the image processing apparatus D 40 are the same as those with the same names of the image processing apparatus A 10, and the description thereof is omitted here.

<Operation>

Figure 4:
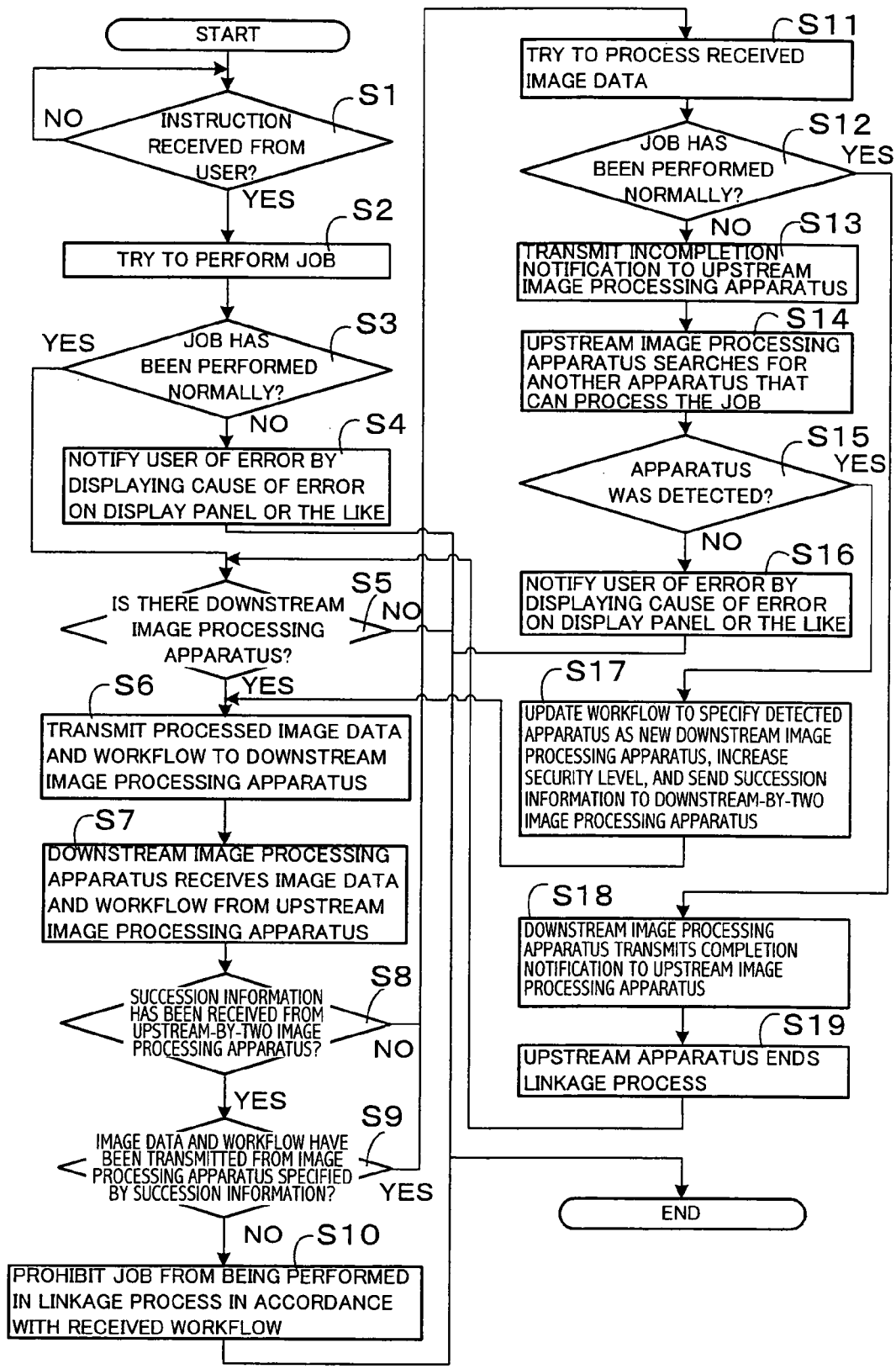
FIG. 4 shows a procedure of the linkage process that include a process performed by the network image processing system 100 after an error occurs.

FIG. 4 shows a procedure of the linkage process that include a process performed by the network image processing system 100 after an error occurs.

The following describes the procedure of the linkage process with reference to FIG. 4.

In the following description, the workflow 1 shown in FIG. 2 is used, and it is presumed that an error occurs in the image processing apparatus B 20, the image processing apparatus D 40 performing the job in place of the image processing apparatus B 20.

(1) A predetermined image processing apparatus starts performing a linkage process upon receiving an instruction from the user (step S1). It is presumed here that the image processing apparatus A 10 starts performing the linkage process.

(2) The predetermined image processing apparatus tries to perform a job on image data in accordance with a workflow held by the apparatus itself (step S2). It is presumed here that in the image processing apparatus A 10, the processing unit 13 tries to scan a document in accordance with the workflow 1 shown in FIG. 2 held by the holding unit 12.

(3) It is judged whether the job has been performed normally (step S3). It is presumed here that in the image processing apparatus A 10, the linkage unit 15 judges that the scanning has been performed normally.

(4) If the job has not been performed normally in the predetermined image processing apparatus, a cause of the scanning error, for example, is displayed on a display panel or the like to notify the user of the error, and the linkage process is ended (step S4).

(5) If the job for the predetermined image processing apparatus has been performed normally by the predetermined image processing apparatus itself or by a downstream image processing apparatus, it is judged based on the workflow held by the holding unit 12 either in advance or after receiving whether the apparatus has a downstream image processing apparatus (step S5). If it is judged that the apparatus does not have a downstream image, processing apparatus, the linkage process is ended. In the present example, it is presumed that in the first round, it is judged that the image processing apparatus A 10 has the image processing apparatus B 20 as a downstream image processing apparatus, and in the second round it is judged that the image processing apparatus D 40 has the image processing apparatus C 30 as a downstream image processing apparatus, and in the third round it is judged that the image processing apparatus C 30 does not have a downstream image processing apparatus, and the linkage process is ended.

(6) The image processing apparatus processes image data in accordance with the latest workflow that has been held, or received, or updated, and transmits the processed image data and the latest workflow to the downstream image processing apparatus, and tries to continue to perform the jobs in the linkage process (step S6). It is presumed here that in the first round, the image processing apparatus A 10 transmits image data obtained by scanning a document and the workflow 1 held by the image processing apparatus A 10 to the image processing apparatus B 20; in the second round, the image processing apparatus A 10 transmits image data obtained by scanning a document and the workflow 2 that is an updated workflow to the image processing apparatus D 40; and in the third round, the image processing apparatus D 40 transmits image data, which is a result of the OCR process, and the workflow 2 to the image processing apparatus C 30.

(7) The downstream image processing apparatus receives the image data and the workflow from the upstream image processing apparatus (step S7). It is presumed here that in the first round, the receiving unit 21 of the image processing apparatus B 20 receives the image data and the workflow 1 from the image processing apparatus A 10; in the second round, the receiving unit 41 of the image processing apparatus D 40 receives the image data and the workflow 2 from the image processing apparatus A 10; and in the third round, the receiving unit 31 of the image processing apparatus C 30 receives the image data and the workflow 2 from the image processing apparatus D 40.

(8) The downstream image processing apparatus judges whether it has received succession information from an image processing apparatus that is upstream of the downstream image processing apparatus by two (step S8). It is presumed here that in the first round, the image processing apparatus B 20 judges that it has not received succession information from the image processing apparatus A 10; in the second round, the image processing apparatus D 40 judges that it has not received succession information from the image processing apparatus A 10; and in the third round, the image processing apparatus C 30 judges that it has received succession information from the image processing apparatus A 10.

(9) If the downstream image processing apparatus judges that it has received succession information from an upstream-by-two image processing apparatus, and if the received workflow is specified by the succession information, it is judged whether the image data and the workflow have been transmitted from the image processing apparatus that is specified by the succession information (step S9). It is presumed here that the image processing apparatus C 30 conforms that the received workflow is specified by the succession information, and judges that the received image data and workflow have been transmitted from the image processing apparatus D 40 that is specified by the succession information.

(10) If it is judged that the received image data and workflow have been transmitted from an image processing apparatus that is different from the one specified by the succession information, the system prohibits the job from being performed in the linkage process in accordance with the received workflow, judging that the apparatus is highly possible to be an unauthorized apparatus, and the linkage process is ended (step S10).

(11) If the downstream image processing apparatus judges that it has not received succession information from an upstream-by-two image processing apparatus, or if it is judged that the image data and the workflow have been transmitted from the image processing apparatus that is specified by the succession information, the downstream image processing apparatus tries to process the received image data in accordance with the received workflow (step S11). It is presumed here that in the first round, the image processing apparatus B 20 tries to perform the OCR process on the image data received by the processing unit 23 in accordance with the received workflow 1; in the second round, the image processing apparatus D 40 tries to perform the OCR process on the image data received by the processing unit 43 in accordance with the received workflow 2; and in the third round, the image processing apparatus C 30 tries to upload the image data received by the processing unit 33 in accordance with the received workflow 2.

(12) The downstream image processing apparatus judges whether it has performed the job normally (step S12). It is presumed here that in the first round, the linkage unit 25 of the image processing apparatus B 20 judges that the OCR process has not been performed normally; in the second round, the linkage unit 45 of the image processing apparatus D 40 judges that the OCR process has been performed normally; and that in the third round, the linkage unit 35 of the image processing apparatus C 30 judges that the uploading process has been performed normally.

(13) If the downstream image processing apparatus judges that it has not performed the job normally, it transmits an incompletion notification to the upstream image processing apparatus (step S13). It is presumed here that the linkage unit 25 of the image processing apparatus B 20 transmits an incompletion notification to the image processing apparatus A 10 via the network 50.

(14) Upon receiving the incompletion notification from the downstream image processing apparatus, the upstream image processing apparatus searches for another apparatus that can process the job that is currently assigned to the downstream image processing apparatus (step S14).

(15) The upstream image processing apparatus judges whether it has detected an apparatus that can process the job (step S15). It is presumed here that the image processing apparatus A 10 receives an incompletion notification from the image processing apparatus B 20, and detects the image processing apparatus D 40, among the image processing apparatuses connected to the network 50, as an apparatus that can perform the OCR process that has been assigned to the image processing apparatus B 20.

(16) If the upstream image processing apparatus fails to detect an apparatus that can process the job, a cause of the searching error is displayed on a display panel or the like to notify the user of the error, and the linkage process is ended (step S16).

(17) If the upstream image processing apparatus detects an apparatus that can process the job, it updates a workflow so that it specifies the detected apparatus as a new image processing apparatus that is downstream of the upstream image processing apparatus, continues to perform the job in the linkage process, increases the security level, and if it has an image processing apparatus that is downstream of the upstream image processing apparatus by two, sends the succession information to the downstream-by-two image processing apparatus (step S17). It is presumed here that the image processing apparatus A 10 receives an incompletion notification from the image processing apparatus B 20, detects the image processing apparatus D 40, among the image processing apparatuses that are connected to the network 50, as an apparatus that can perform the OCR process assigned to the image processing apparatus B 20, determines the image processing apparatus D 40 as a new downstream image processing apparatus, updates the workflow 1 to the workflow 2 by rewriting "image processing apparatus B" as "image processing apparatus D", sends the succession information to the downstream-by-two image processing apparatus, and returns to step S5.

(18) If the downstream image processing apparatus judges that it has performed the job normally, it transmits a completion notification to the upstream image processing apparatus (step S18). It is presumed here that in the first round, the linkage unit 45 of the image processing apparatus D 40 transmits a completion notification to the image processing apparatus A 10 via the network 50; and in the second round, the linkage unit 35 of the image processing apparatus C 30 transmits a completion notification to the image processing apparatus D 40 via the network 50.

(19) If the upstream apparatus receives a completion notification, the upstream apparatus ends the linkage process in terms of the upstream apparatus, and notifies the user of the completion of the job by displaying a message or the like on a display panel or the like, and returns to step S5 (step S19). It is presumed here that in the first round, the image processing apparatus A 10 receives a completion notification from the image processing apparatus D 40; and in the second round, the image processing apparatus D 40 receives a completion notification from the image processing apparatus C 30.

It should be noted here that a workflow transmitted from an upstream apparatus to a downstream apparatus does not need to specify the jobs that have been completed already, and only needs to specify at least one or more jobs that have not been completed at the point in time when the workflow is transmitted, and the procedure for the one or more jobs.

<Summary>

As described above, according to Embodiment 1 of the present invention, if an error occurs to a downstream apparatus, an apparatus that is upstream of the downstream apparatus by one searches for another apparatus that can perform the job that has not been completed due to the error, assigns the job to the new downstream apparatus, and continues the job in the linkage process. The system also increases the security level after an error occurs. This improves the operating efficiency and ensures the security in regards with an irregular process.

Embodiment 2

Outline

Embodiment 2 of the present invention relates to a network image processing system for performing a job in a linkage process in which image data to be processed by the job and an identification of a workflow, which specifies the job and a procedure for the job, are passed from an upstream apparatus to a downstream apparatus among a plurality of apparatuses connected to a network, in accordance with the procedure specified by the workflow as the job is performed by the upstream apparatus and the downstream apparatus, each of the plurality of apparatuses prestoring therein a workflow, and if an error occurs in a downstream apparatus, an apparatus that is upstream of the downstream apparatus by one detects an apparatus that can perform the job in place of the downstream apparatus, and continues to perform the job in the linkage process.

<Construction>

A network image processing system 200 in Embodiment 2 of the present invention includes an image processing apparatus A 210, an image processing apparatus B 220, an image processing apparatus C 230, an image processing apparatus D 240, and the network 50 that connects these image processing apparatuses.

It should be noted here that the same components as those in Embodiment 1 are assigned the same numbers and the description thereof is omitted here.

The relationships between the image processing apparatuses constituting the network image processing system 200 in Embodiment 2 are the same as those constituting the network image processing system 100 in Embodiment 1. Accordingly, the image processing apparatuses A 210 to D 240 in Embodiment 2 respectively correspond to the image processing apparatuses A 10 to D 40 in Embodiment 1.

Figure 5:
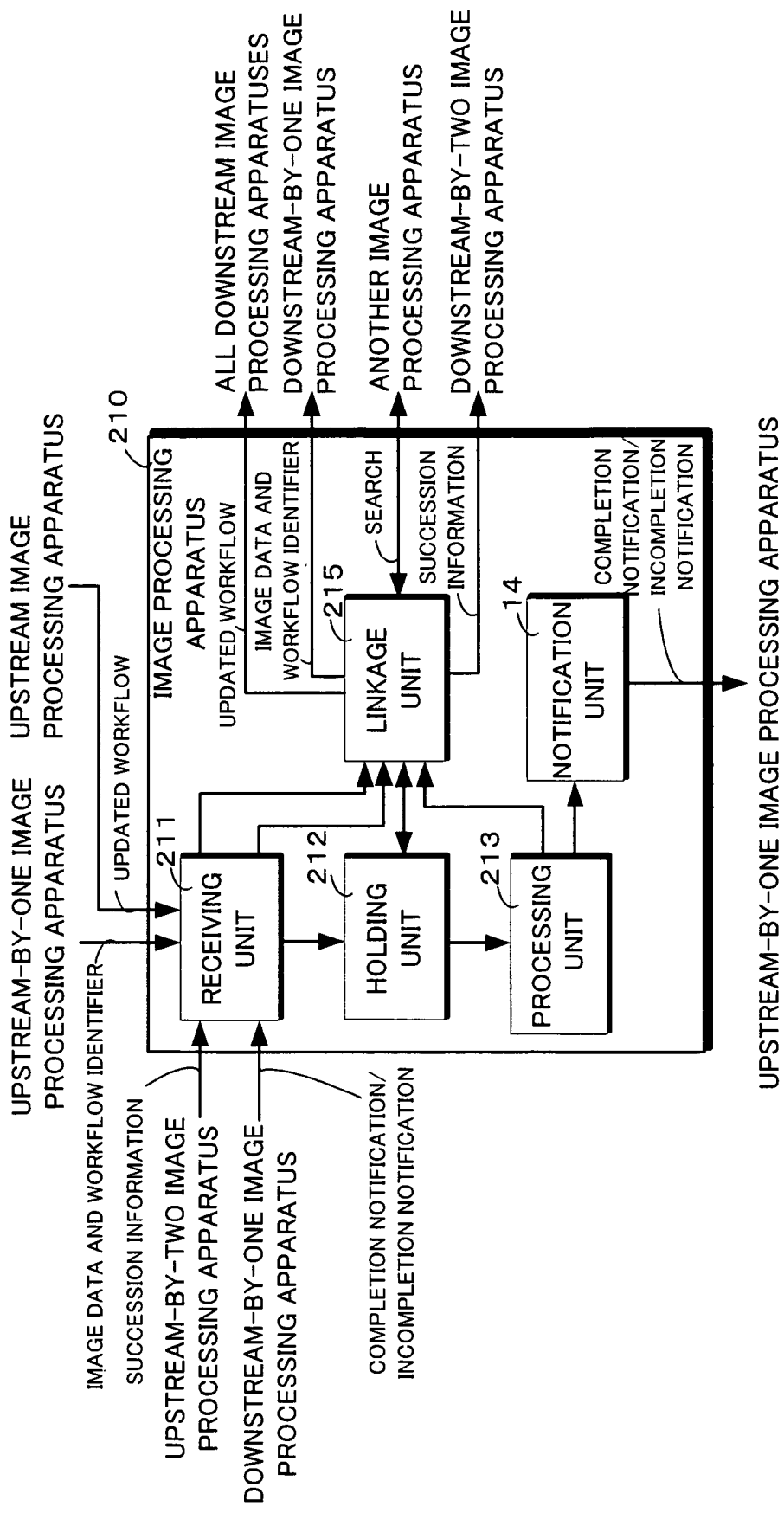
FIG. 5 shows the detailed construction of the image processing apparatus A 210.

FIG. 5 shows the detailed construction of the image processing apparatus A 210.

As shown in FIG. 5, the image processing apparatus A 210 includes a receiving unit 211, a holding unit 212, a processing unit 213, a notification unit 214, and a linkage unit 215.

The receiving unit 211 receives image data to be processed and a workflow identifier via the network 50 from an image processing apparatus that is upstream of the present image processing apparatus by one, receives succession information from an image processing apparatus that is upstream of the present image processing apparatus by two, receives an updated workflow from an image processing apparatus that is upstream of the present image processing apparatus, and receives a completion notification or an incompletion notification from an image processing apparatus that is downstream of the present image processing apparatus by one.

The holding unit 212 holds in advance one or more workflows that can be identified by workflow identifiers, and holds image data either in advance or after receiving it from another apparatus. If an updated workflow is received by the receiving unit 211, the holding unit 212 updates a workflow among the workflows it holds whose workflow identifier matches that of the updated workflow, with the updated workflow.

The processing unit 213 performs a job that is assigned to the present image processing apparatus, using the image data held by the holding unit 212 in accordance with one of workflows held by the holding unit 212 either in advance or after updating that has a workflow identifier that matches the received workflow identifier.

The linkage unit 215, upon completion of a job of the present image processing apparatus, transmits, based on a workflow among the workflows held by the holding unit 212 whose workflow identifier matches that of the received workflow identifier, the workflow and image data, which is a result of the job, to an image processing apparatus that is downstream of the present image processing apparatus by one. When the receiving unit 211 receives a completion notification from an image processing apparatus that is downstream of the present image processing apparatus by one, the linkage unit 215 ends the linkage process in terms of the present image processing apparatus. If the receiving unit 211 does not receive a completion notification from a downstream-by-one image processing apparatus, the linkage unit 215 updates workflows held by all downstream apparatuses so that they specify another apparatus that can process the job that has been assigned to the downstream-by-one image processing apparatus, as a new downstream image processing apparatus. In the present example, the linkage unit 215 searches among the image processing apparatuses that are connected to the network 50 for an apparatus that can process the job that is currently assigned to the downstream-by-one image processing apparatus, and determines the apparatus detected by the search to be a new downstream image processing apparatus. The linkage unit 215 sends succession information, which indicates that a new downstream apparatus has justly succeeded a job, specifying the new downstream apparatus and the workflow, to an image processing apparatus that is downstream of the present image processing apparatus by two. Also, if the receiving unit 211 receives succession information, the linkage unit 215 judges whether or not a workflow specified by the succession information has a workflow identifier that matches a workflow identifier received from an image processing apparatus that is specified by the succession information. If it judges negatively, the linkage unit 215 prohibits the specified job from being performed in the linkage process in accordance with the workflow. This is because there is high possibility that the apparatus is an unauthorized one.

It should be noted here that if the linkage unit 215 does not receive a completion notification from a downstream-by-one image processing apparatus, the job assigned to the apparatus may be continued to be performed in the linkage process in the high secure mode that has a higher security level than a normal security level such that the job is performed with a higher security level than a normal security level. In the high secure mode, for example, encryption may be used in transmitting or receiving image data, a workflow identifier, an updated workflow, succession information or the like.

The image processing apparatus B 220 includes a receiving unit 221, a holding unit 222, a processing unit 223, a notification unit 224, and a linkage unit 225. These components of the image processing apparatus B 220 are the same as those with the same names of the image processing apparatus A 210, and the description thereof is omitted here.

The image processing apparatus C 230 includes a receiving unit 231, a holding unit 232, a processing unit 233, a notification unit 234, and a linkage unit 235. These components of the image processing apparatus C 230 are the same as those with the same names of the image processing apparatus A 210, and the description thereof is omitted here.

The image processing apparatus D 240 includes a receiving unit 241, a holding unit 242, a processing unit 243, a notification unit 244, and a linkage unit 245. These components of the image processing apparatus D 240 are the same as those with the same names of the image processing apparatus A 210, and the description thereof is omitted here.

<Operation>

Figure 6:
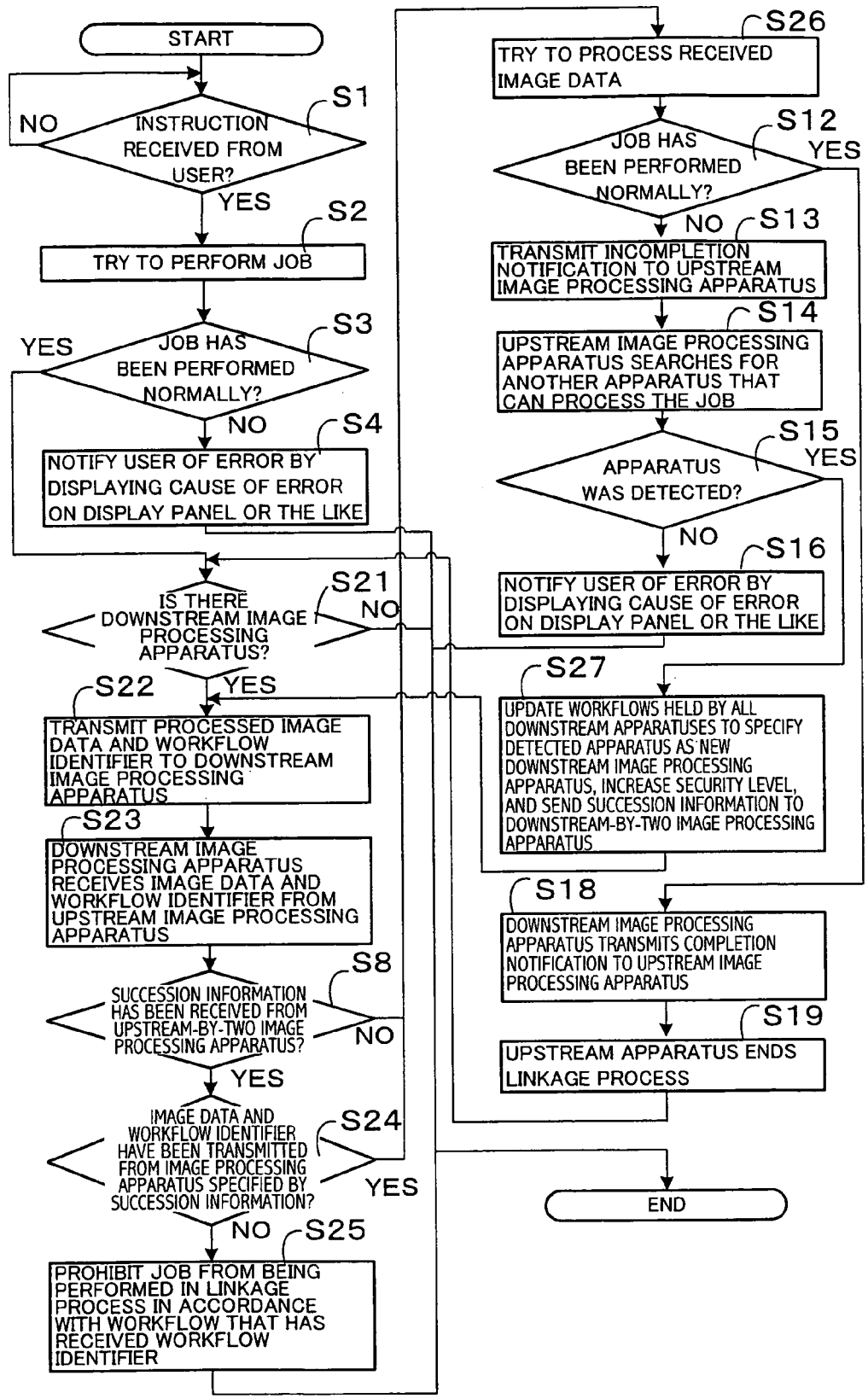
FIG. 6 shows a procedure of the linkage process that include a process performed by the network image processing system 200 after an error occurs.

FIG. 6 shows a procedure of the linkage process that include a process performed by the network image processing system 200 after an error occurs.

The following describes the procedure of the linkage process with reference to FIG. 6.

In the following description, the workflow 1 shown in FIG. 2 is used, and it is presumed that an error occurs in the image processing apparatus B 220, the image processing apparatus D 240 performing the job in place of the image processing apparatus B 220.

The steps that are the same as those shown in FIG. 4 of Embodiment 1 are assigned with the same numbers, and the description thereof is omitted.

(1)-(4) The steps S1 to S4 of Embodiment 1 are performed. In these operations of the present embodiment, it is presumed that the image processing apparatus A 210 starts performing the linkage process, the processing unit 213 tries to scan a document in accordance with the workflow 1 shown in FIG. 2 held by the holding unit 212, and the linkage unit 215 judges that the scanning has been performed normally.

(5) If the job for the predetermined image processing apparatus has been performed normally by the predetermined image processing apparatus itself or by a downstream image processing apparatus, it is judged whether the apparatus has a downstream image processing apparatus in accordance with one of workflows held by the holding unit 212 that has a workflow identifier that matches the received workflow identifier (step S21). If it is judged that the apparatus does not have a downstream image processing apparatus, the linkage process is ended. In the present example, it is presumed that in the first round, it is judged that the image processing apparatus A 210 has the image processing apparatus B 220 as a downstream image processing apparatus, and in the second round it is judged that the image processing apparatus D 240 has the image processing apparatus C 230 as a downstream image processing apparatus, and in the third round it is judged that the image processing apparatus C 230 does not have a downstream image processing apparatus, and the linkage process is ended.

(6) The image processing apparatus processes image data in accordance with the latest workflow that has been held, or received, or updated, and transmits the processed image data and the workflow identifier of the latest workflow to the downstream image processing apparatus, and tries to continue to perform the jobs in the linkage process (step S22). It is presumed here that in the first round, the image processing apparatus A 210 transmits image data obtained by scanning a document and a workflow identifier of the workflow 1 to the image processing apparatus B 220; in the second round, the image processing apparatus A 210 transmits image data obtained by scanning a document and the workflow 2 that is an updated workflow to the image processing apparatus D 240; and in the third round, the image processing apparatus D 240 transmits image data, which is a result of the OCR process, and a workflow identifier of the workflow 2 to the image processing apparatus C 230.

(7) The downstream image processing apparatus receives the image data and the workflow identifier from the upstream image processing apparatus (step S23). It is presumed here that in the first round, the receiving unit 221 of the image processing apparatus B 220 receives the image data and the workflow identifier of the workflow 1 from the image processing apparatus A 210; in the second round, the receiving unit 241 of the image processing apparatus D 240 receives the image data and the workflow identifier of the workflow 2 from the image processing apparatus A 210; and in the third round, the receiving unit 231 of the image processing apparatus C 230 receives the image data and the workflow identifier of the workflow 2 from the image processing apparatus D 240.

(8) The step S8 of Embodiment 1 is performed. In this operation of the present embodiment, it is presumed that in the first round, the image processing apparatus B 220 judges that it has not received succession information from the image processing apparatus A 210; in the second round, the image processing apparatus D 240 judges that it has not received succession information from the image processing apparatus A 210; and in the third round, the image processing apparatus C 230 judges that it has received succession information from the image processing apparatus A 210.

(9) If the downstream image processing apparatus judges that it has received succession information from an upstream-by-two image processing apparatus, and if a workflow that has the received workflow identifier matches the workflow that is specified by the succession information, it is judged whether the image data and the workflow identifier have been transmitted from the image processing apparatus that is specified by the succession information (step S24). It is presumed here that the image processing apparatus C 230 conforms that a workflow that has the received workflow identifier matches the workflow that is specified by the succession information, and judges that the received image data and workflow identifier have been transmitted from the image processing apparatus D 240 that is specified by the succession information.

(10) If it is judged that the received image data and workflow identifier have been transmitted from an image processing apparatus that is different from the one specified by the succession information, the system prohibits the job from being performed in the linkage process in accordance with the workflow that has the received workflow identifier, judging that the apparatus is highly possible to be an unauthorized apparatus, and the linkage process is ended (step S25).

(11) If the downstream image processing apparatus judges that it has not received succession information from an upstream-by-two image processing apparatus, or if it is judged that the image data and the workflow have been transmitted from the image processing apparatus that is specified by the succession information, the downstream image processing apparatus tries to process the received image data in accordance with the received workflow (step S26). It is presumed here that in the first round, the image processing apparatus B 220 tries to perform the OCR process on the image data received by the processing unit 223 in accordance with the workflow 1 that has the received workflow identifier; in the second round, the image processing apparatus D 240 tries to perform the OCR process on the image data received by the processing unit 243 in accordance with the workflow 2 that has the received workflow identifier; and in the third round, the image processing apparatus C 230 tries to upload the image data received by the processing unit 233 in accordance with the workflow 2 that has the received workflow identifier.

(12)-(16) The steps S12 to S16 of Embodiment 1 are performed. In these operations of the present embodiment, it is presumed here that in the first round, the linkage unit 225 of the image processing apparatus B 220 judges that the OCR process has not been performed normally and transmits an incompletion notification to the image processing apparatus A 210 via the network 50, the image processing apparatus A 210 receives the incompletion notification from the image processing apparatus B 220, and detects the image processing apparatus D 240 among the image processing apparatuses connected to the network 50 as an image processing apparatus that can perform the OCR process assigned to the image processing apparatus B 220; in the second round, the linkage unit 245 of the image processing apparatus D 240 judges that the OCR process has been performed normally; and in the third round, the linkage unit 235 of the image processing apparatus C 230 judges that the uploading process has been performed normally.

(17) If the upstream image processing apparatus detects an apparatus that can process the job, it updates workflows held by all downstream apparatuses so that they specify the detected apparatus as a new image processing apparatus that is downstream of the upstream image processing apparatus, continues to perform the job in the linkage process, increases the security level, and if it has an image processing apparatus that is downstream of the upstream image processing apparatus by two, sends the succession information to the downstream-by-two image processing apparatus (step S27). It is presumed here that the image processing apparatus A 210 receives an incompletion notification from the image processing apparatus B 220, detects the image processing apparatus D 240, among the image processing apparatuses that are connected to the network 50, as an apparatus that can perform the OCR process assigned to the image processing apparatus B 220, determines the image processing apparatus D 240 as a new downstream image processing apparatus, updates the workflow 1 to the workflow 2 by rewriting "image processing apparatus B" as "image processing apparatus D", transmits the workflow 2 and the workflow identifier of the workflow 1 to the image processing apparatuses D240 and C230 so that the workflow 1 is updated, transmits the succession information to the downstream-by-two image processing apparatus, and returns to step S21.

(18)-(19) The steps S18 to S19 of Embodiment 1 are performed. In these operations of the present embodiment, it is presumed that in the first round, the linkage unit 245 of the image processing apparatus D 240 transmits a completion notification to the image processing apparatus A 210 via the network 50; and in the second round, the linkage unit 235 of the image processing apparatus C 230 transmits a completion notification to the image processing apparatus D 240 via the network 50, and the image processing apparatus D 240 receives the completion notification from the image processing apparatus C 230 via the network 50.

<Summary>

As described above, according to Embodiment 2 of the present invention, as is the case with Embodiment 1, if an error occurs to a downstream apparatus, an apparatus that is upstream of the downstream apparatus by one searches for another apparatus that can perform the job that has not been completed due to the error, assigns the job to the new downstream apparatus, and continues the job in the linkage process. The system also increases the security level after an error occurs. This improves the operating efficiency and ensures the security in regards with an irregular process.

Modification 1

<Outline>

Modification 1 of the present invention shows details of the encryption process that is performed when an error occurs in the system described in Embodiment 1 or 2. If an error occurs to a downstream apparatus, an apparatus that is upstream of the downstream apparatus by one searches for another apparatus that can perform the job that has not been completed due to the error, generates a common key, distributes the generated common key both to an image processing apparatus that is downstream of the present image processing apparatus by two and to the replacing image processing apparatus. Having received the common key, the two apparatuses perform data transmission/reception using the common key between themselves. This means that if an error occurs, the job is continued to be performed in the linkage process with a higher security level than usual.

<Construction>

Figure 7:
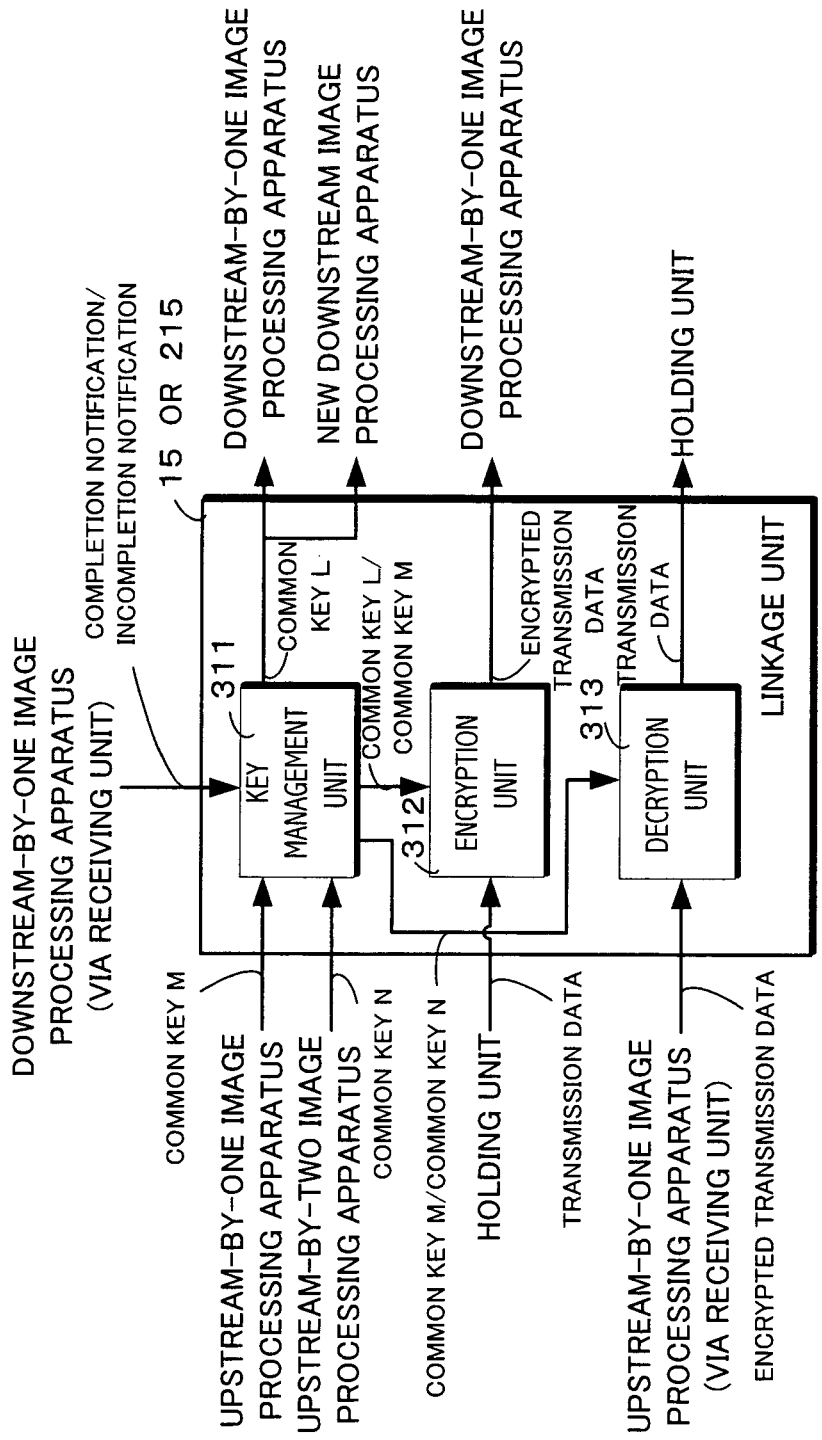
FIG. 7 shows a detailed construction of the linkage unit 15 of Embodiment 1 or the linkage unit 215 of Embodiment 2.

FIG. 7 shows a detailed construction of the linkage unit 15 of Embodiment 1 or the linkage unit 215 of Embodiment 2.

As shown in FIG. 7, the linkage unit 15 or 215 includes a key management unit 311, an encryption unit 312, and a decryption unit 313.

The key management unit 311, if a completion notification is not received, generates a common key and distributes the generated common key to an image processing apparatus that is downstream of the present image processing apparatus by two and to a new downstream image processing apparatus in a safe manner, for example, using the secret key encryption method. The key management unit 311 receives a common key that is generated and distributed from an image processing apparatus that is upstream of the present image processing apparatus by one, and receives a common key that is generated and distributed from an image processing apparatus that is upstream of the present image processing apparatus by two.

The encryption unit 312, if the present image processing apparatus generates and distributes a common key, or if the present image processing apparatus receives a common key that is distributed from an image processing apparatus that is upstream of the present image processing apparatus by one, encrypts part or all of data that is to be transmitted to an apparatus that is downstream of the present image processing apparatus by one, using the common key. For example, the encryption unit 312 encrypts at least one of the image data and a workflow, encrypts at least one of the image data and a workflow identifier.

The decryption unit 313 decrypts encrypted data using a common key if the present image processing apparatus receives the common key and the encrypted data from an image processing apparatus that is upstream of the present image processing apparatus by one. The decryption unit 313 also decrypts encrypted data using a common key if the present image processing apparatus receives the common key from an image processing apparatus that is upstream of the present image processing apparatus by two and receives the encrypted data from an image processing apparatus that can perform a job assigned to an image processing apparatus that is upstream of the present image processing apparatus by one.

The linkage unit 25 or 225 includes a key management unit 321, an encryption unit 322, and a decryption unit 323. These components are the same as those with the same names of the linkage unit 15 or 215, and the description thereof is omitted here. The linkage unit 35 or 235 includes a key management unit 331, an encryption unit 332, and a decryption unit 333. These components are the same as those with the same names of the linkage unit 15 or 215, and the description thereof is omitted here.

The linkage unit 45 or 245 includes a key management unit 341, an encryption unit 342, and a decryption unit 343. These components are the same as those with the same names of the linkage unit 15 or 215, and the description thereof is omitted here.

<Operation>

Figure 8:
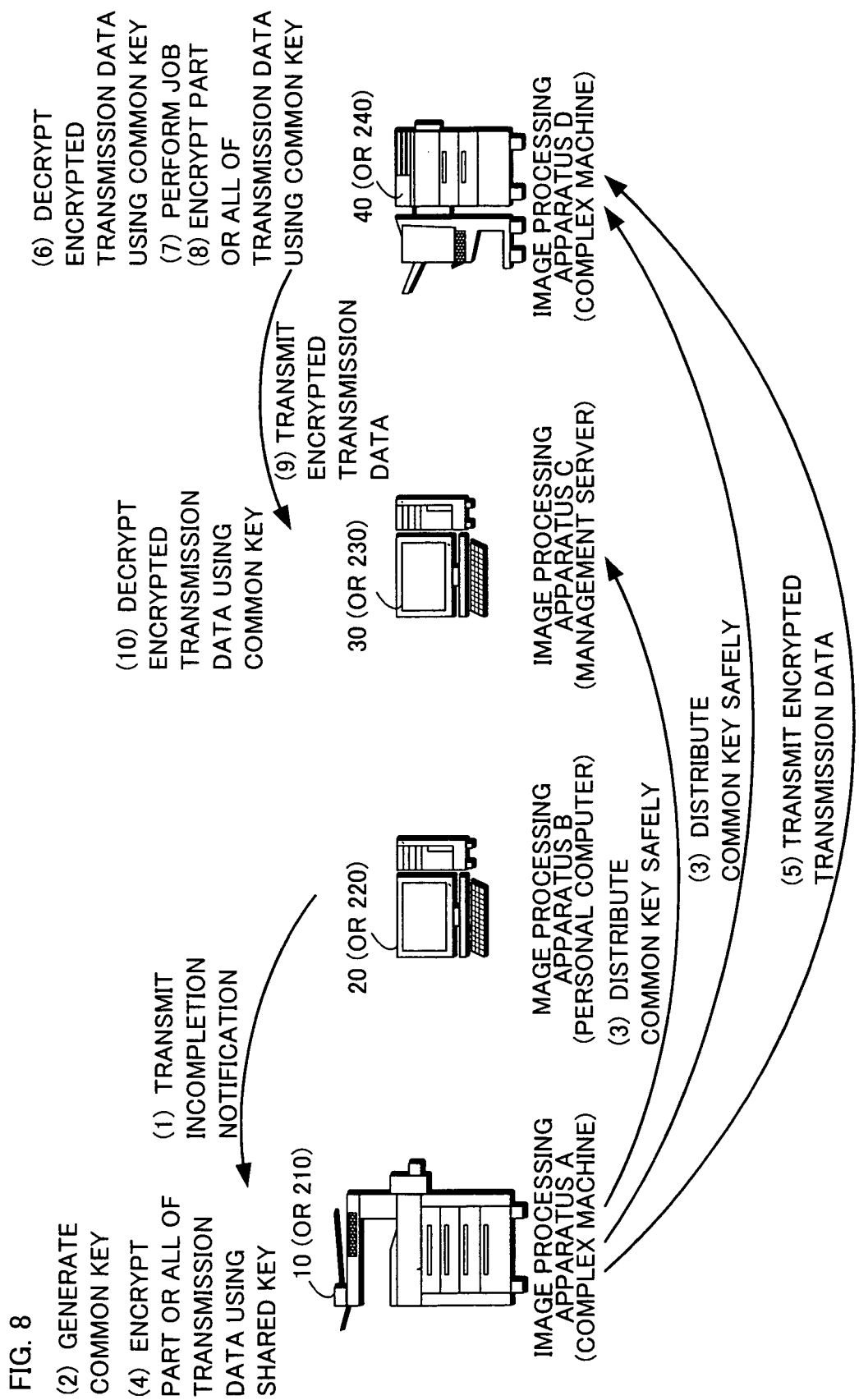
FIG. 8 shows an outline of an encryption process that is performed when an error occurs in Modification 1.

FIG. 8 shows an outline of an encryption process that is performed when an error occurs in Modification 1.

The following describes the outline of the encryption process performed after an error occurs, with reference to FIG. 8.

In the following description, the workflow 1 shown in FIG. 2 is used, and it is presumed that an error occurs in the image processing apparatus B 20 or 220, the image processing apparatus D 40 or 240 performing the job in place of the image processing apparatus B 20 or 220.

(1) If the image processing apparatus B 20 or 220 fails to perform a job normally, it transmits an incompletion notification. The image processing apparatus A 10 or 210 receives the incompletion notification.

(2) The key management unit 311 of the image processing apparatus A 10 or 210 generates common key.

(3) The image processing apparatus A 10 or 210 distributes the generated common key in a safe manner to the image processing apparatus C 30 or 230 that is downstream of the present image processing apparatus by two and to the image processing apparatus A 40 or 240 that is a new downstream image processing apparatus. The key management unit 331 of the image processing apparatus C 30 or 230 and the key management unit 341 of the image processing apparatus D 40 or 240 receives the common key from the image processing apparatus A 10 or 210.

(4) The encryption unit 312 of the image processing apparatus A 10 or 210 encrypts part or all of data to be transmitted to the new downstream image processing apparatus D40 or 240, using a common key generated by the key management unit 311.

(5) The image processing apparatus A 10 or 210 tries to continue to perform the job in the linkage process by transmitting the data that has been partially or entirely encrypted. The image processing apparatus D 40 or 240 receives the encrypted data.

(6) The decryption unit 343 of the image processing apparatus D 40 or 240 decrypts the encrypted data using the common key that has been distributed from the image processing apparatus A 10 or 210.

(7) The image processing apparatus D 40 or 240 performs the job assigned to the apparatus D 40 or 240 itself.

(8) The image processing apparatus D 40 or 240 completes the job normally, then the encryption unit 342 encrypts part or all of data to be transmitted to the image processing apparatus C 30 or 230 that is downstream of the network image processing apparatus D 40 or 240 by one, using the common key that has been distributed from the image processing apparatus A 10 or 210.

(9) The image processing apparatus D 40 or 240 tries to continue to perform the job in the linkage process by transmitting the data that has been partially or entirely encrypted. The image processing apparatus C 30 or 230 receives the encrypted data.

(10) The decryption unit 333 of the image processing apparatus C 30 or 230 decrypts the encrypted data using the common key that has been distributed from the image processing apparatus A 10 or 210. If the decryption unit 333 succeeds in the decryption, the image processing apparatus D 40 or 240 is judged to be an authorized apparatus, and the operation is continued to perform the subsequent processes. If the decryption unit 333 fails to decrypt the data normally or the data had not been encrypted in its entirety, the linkage process is stopped judging that the image processing apparatus D 40 or 240 is highly possible to be an unauthorized apparatus.

<Summary>

As described above, according to Modification 1 of the present invention, if an error occurs to a downstream apparatus, an encryption process is used in the data transmission/reception with the replacing apparatus. In particular, an image processing apparatus that is downstream of the present image processing apparatus by two tries to decrypt encrypted data that has been received from the replacing apparatus, and only if it succeeds in the decryption, the linkage process is continued. This construction ensures a higher level of security in case an error occurs, and prevents occurrence of an unauthenticated act such as a spoofing, thus improving the security level efficiently.

Modification 2

<Outline>

Modification 2 of the present invention, as is the case with Modification 1, shows details of the encryption process that is performed when an error occurs in the system described in Embodiment 1 or 2. Each apparatus generates a common key in advance and distributes the common key to apparatuses that are upstream and downstream of the present apparatus by one, respectively. If an error occurs to a downstream apparatus, an apparatus that is upstream of the downstream apparatus by one searches for another apparatus that can perform the job that has not been completed due to the error, distributes the common key, which has been received from the downstream apparatus to which the error occurred, to the replacing image processing apparatus. After this, the replacing image processing apparatus and an image processing apparatus that is downstream of the replacing image processing apparatus by one perform data transmission/reception using the common key between themselves. This means that if an error occurs, the job is continued to be performed in the linkage process with a higher security level than usual.

<Construction>

Figure 9:
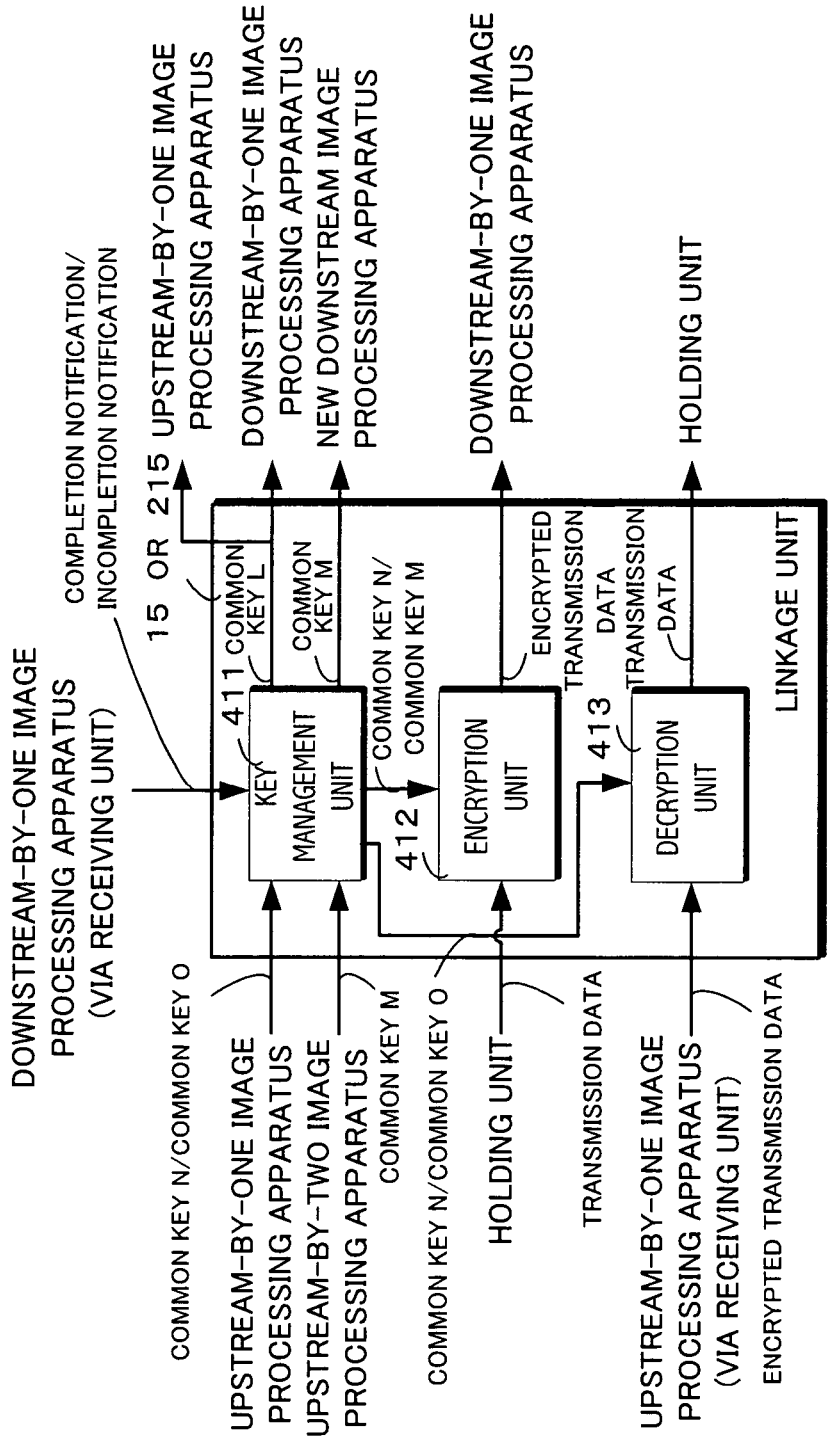
FIG. 9 shows a detailed construction of the linkage unit 15 of Embodiment 1 or the linkage unit 215 of Embodiment 2.

FIG. 9 shows a detailed construction of the linkage unit 15 of Embodiment 1 or the linkage unit 215 of Embodiment 2.

As shown in FIG. 9, the linkage unit 15 or 215 includes a key management unit 411, an encryption unit 412, and a decryption unit 413.

The key management unit 411 generates a common key in advance and distributes the common key to apparatuses that are upstream and downstream of the present apparatus by one, in a safe manner, for example, using the secret key encryption method. The key management unit 411 receives, beforehand in a safe manner, a common key that is generated and distributed from an image processing apparatus that is upstream of the present image processing apparatus by one, and also receives, beforehand in a safe manner, a common key that is generated and distributed from an image processing apparatus that is downstream of the present image processing apparatus by one. Also, if a completion notification is not received, the key management unit 411 distributes the common key, which has been received from the downstream apparatus to which the error occurred, to an apparatus that can perform the job assigned to the downstream apparatus to which the error occurred, in a safe manner, for example, using the secret key encryption method. The key management unit 411 may also receive a common key from an image processing apparatus that is upstream of the present image processing apparatus by one, if an error occurs to another image processing apparatus that had transmitted the common key to the upstream present image processing apparatus, and the present image processing apparatus is determined to be the replacing apparatus. It should be noted here that the distribution of a common key may be performed after an error occurs, not in advance.

The encryption unit 412, if the present image processing apparatus transfers a common key, or if the present image processing apparatus receives a common key that was transferred from an image processing apparatus that is upstream of the present image processing apparatus by one, encrypts part or all of data that is to be transmitted to an apparatus that is downstream of the present image processing apparatus by one, using the common key.

The decryption unit 413 decrypts encrypted data using a common key if the present image processing apparatus receives the common key and the encrypted data from an image processing apparatus that is upstream of the present image processing apparatus by one. The decryption unit 413 also decrypts encrypted data using a common key if the present image processing apparatus receives the common key from an image processing apparatus that is upstream of the present image processing apparatus by one and receives the encrypted data from an image processing apparatus that can perform a job assigned to an image processing apparatus that is upstream of the present image processing apparatus by one.

The linkage unit 25 or 225 includes a key management unit 421, an encryption unit 422, and a decryption unit 423. These components are the same as those with the same names of the linkage unit 15 or 215, and the description thereof is omitted here. The linkage unit 35 or 235 includes a key management unit 431, an encryption unit 432, and a decryption unit 433. These components are the same as those with the same names of the linkage unit 15 or 215, and the description thereof is omitted here.

The linkage unit 45 or 245 includes a key management unit 441, an encryption unit 442, and a decryption unit 443. These components are the same as those with the same names of the linkage unit 15 or 215, and the description thereof is omitted here.

<Operation>

Figure 10:
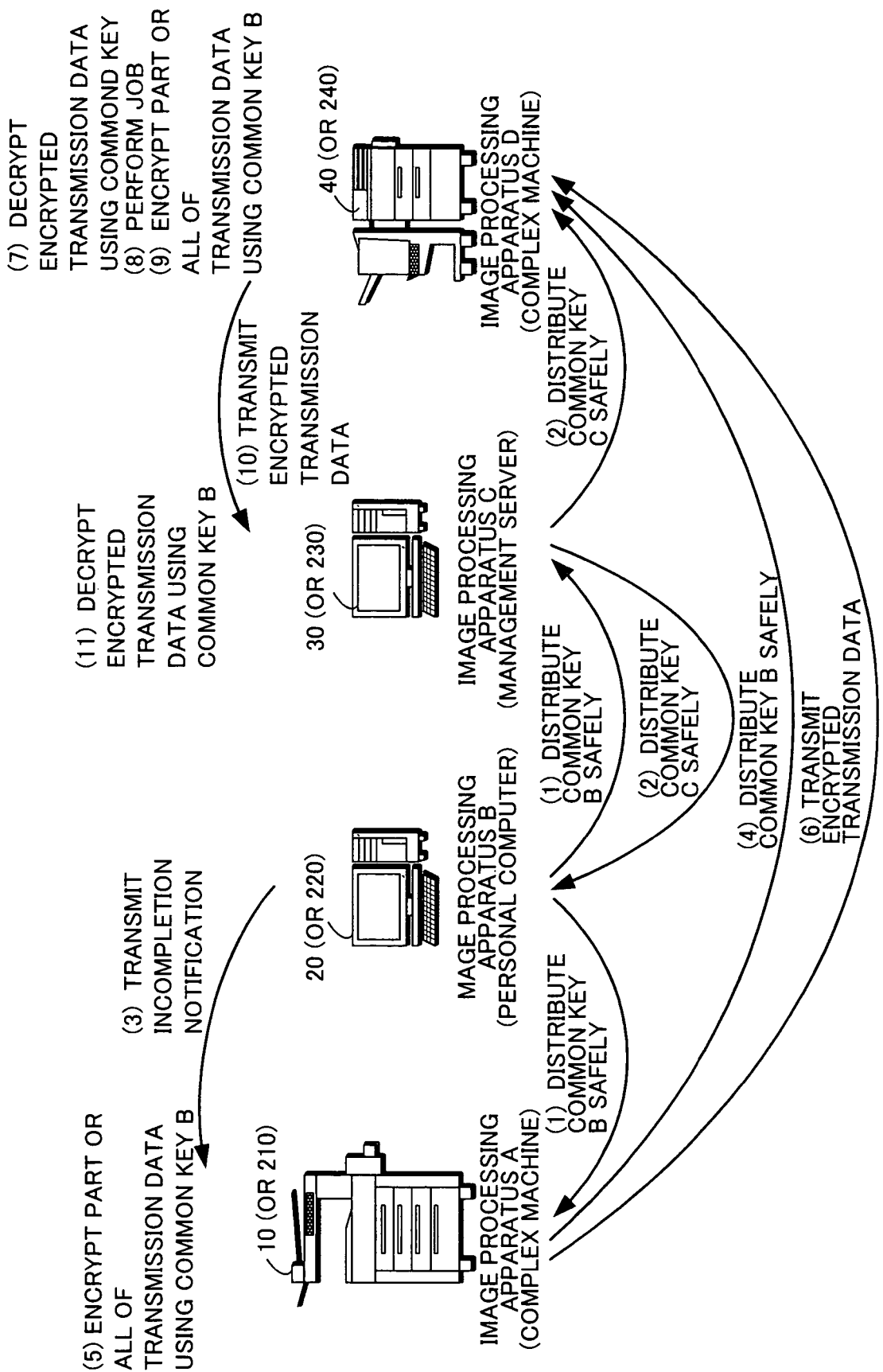
FIG. 10 shows an outline of an encryption process that is performed when an error occurs in Modification 2.

FIG. 10 shows an outline of an encryption process that is performed when an error occurs in Modification 2.

The following describes the outline of the encryption process performed after an error occurs, with reference to FIG. 10.

In the following description, as is the case with Modification 1, the workflow 1 shown in FIG. 2 is used, and it is presumed that an error occurs in the image processing apparatus B 20 or 220, the image processing apparatus D 40 or 240 performing the job in place of the image processing apparatus B 20 or 220.

(1) The key management unit 421 of the image processing apparatus B 20 or 220 generates a common key B in advance, and distributes the common key B both to the image processing apparatus A 10 or 210 being an apparatus that is upstream of the present image processing apparatus by one and to the image processing apparatus C 30 or 230 being an apparatus that is downstream of the present image processing apparatus by one, in a safe manner.

(2) The key management unit 431 of the image processing apparatus C 30 or 230 generates a common key C in advance, and distributes the common key C both to the image processing apparatus B 20 or 220 being an apparatus that is upstream of the present image processing apparatus by one and to the image processing apparatus D 40 or 240 being an apparatus that is downstream of the present image processing apparatus by one, in a safe manner.

(3) If the image processing apparatus B 20 or 220 fails to perform a job normally, it transmits an incompletion notification. The image processing apparatus A 10 or 210 receives the incompletion notification.

(4) The key management unit 411 of the image processing apparatus A 10 or 210 transfers the common key B that had been distributed in advance, to a new downstream apparatus, the image processing apparatus D 40 or 240.

(5) The encryption unit 412 of the image processing apparatus A 10 or 210 encrypts part or all of data to be transmitted to the new downstream image processing apparatus D 40 or 240, using the common key B that had been distributed in advance.

(6) The image processing apparatus A 10 or 210 tries to continue to perform the job in the linkage process by transmitting the data that has been partially or entirely encrypted. The image processing apparatus D 40 or 240 receives the encrypted data.

(7) The decryption unit 443 of the image processing apparatus D 40 or 240 decrypts the encrypted data using the common key B that has been transferred.

(8) The image processing apparatus D 40 or 240 performs the job assigned to the apparatus D 40 or 240 itself.

(9) The image processing apparatus D 40 or 240 completes the job normally, then the encryption unit 442 encrypts part or all of data to be transmitted to the image processing apparatus C 30 or 230 that is downstream of the network image processing apparatus D 40 or 240 by one, using the common key B that has been transferred.

(10) The image processing apparatus D 40 or 240 tries to continue to perform the job in the linkage process by transmitting the data that has been partially or entirely encrypted. The image processing apparatus C 30 or 230 receives the encrypted data.

(11) The decryption unit 433 of the image processing apparatus C 30 or 230 decrypts the encrypted data using the common key B that has been distributed in advance. If the decryption unit 433 succeeds in the decryption, the image processing apparatus D 40 or 240 is judged to be an authorized apparatus, and the operation is continued to perform the subsequent processes. If the decryption unit 433 fails to decrypt the data normally or the data had not been encrypted in its entirety, the linkage process is stopped judging that the image processing apparatus D 40 or 240 is highly possible to be an unauthorized apparatus.

<Summary>

As described above, according to Modification 2 of the present invention, if an error occurs to a downstream apparatus, an encryption process is used in the data transmission/reception with the replacing apparatus. In particular, an image processing apparatus that is downstream of the present image processing apparatus by one tries to decrypt encrypted data that has been received from the replacing apparatus, and only if it succeeds in the decryption, the linkage process is continued. This construction ensures a higher level of security in case an error occurs, and prevents occurrence of an unauthenticated act such as a spoofing, thus improving the security level efficiently.

Modification 3

<Outline>

Modification 3 of the present invention, as is the case with Modifications 1 and 2, shows details of the encryption process that is performed when an error occurs in the system described in Embodiment 1 or 2. If an error occurs to an apparatus (error apparatus), an apparatus that is upstream of the error apparatus by one searches for another apparatus (replacing apparatus) that can perform the job that has not been completed due to the error, receives an authentication decryption key (public key) from the replacing apparatus, and transfers the authentication decryption key to an apparatus that is downstream of the error apparatus by one. The replacing apparatus encrypts data using an authentication encryption key (secret key) of the replacing apparatus itself, and transmits the encrypted data to the apparatus that is downstream of the error apparatus by one. The apparatus that is downstream of the error apparatus by one receives and decrypts the encrypted data using the authentication decryption key having been transferred. This means that the replacing apparatus transmits data with improved reliability, and if an error occurs, the job is continued to be performed in the linkage process with a higher security level than usual.

<Construction>

Figure 11:
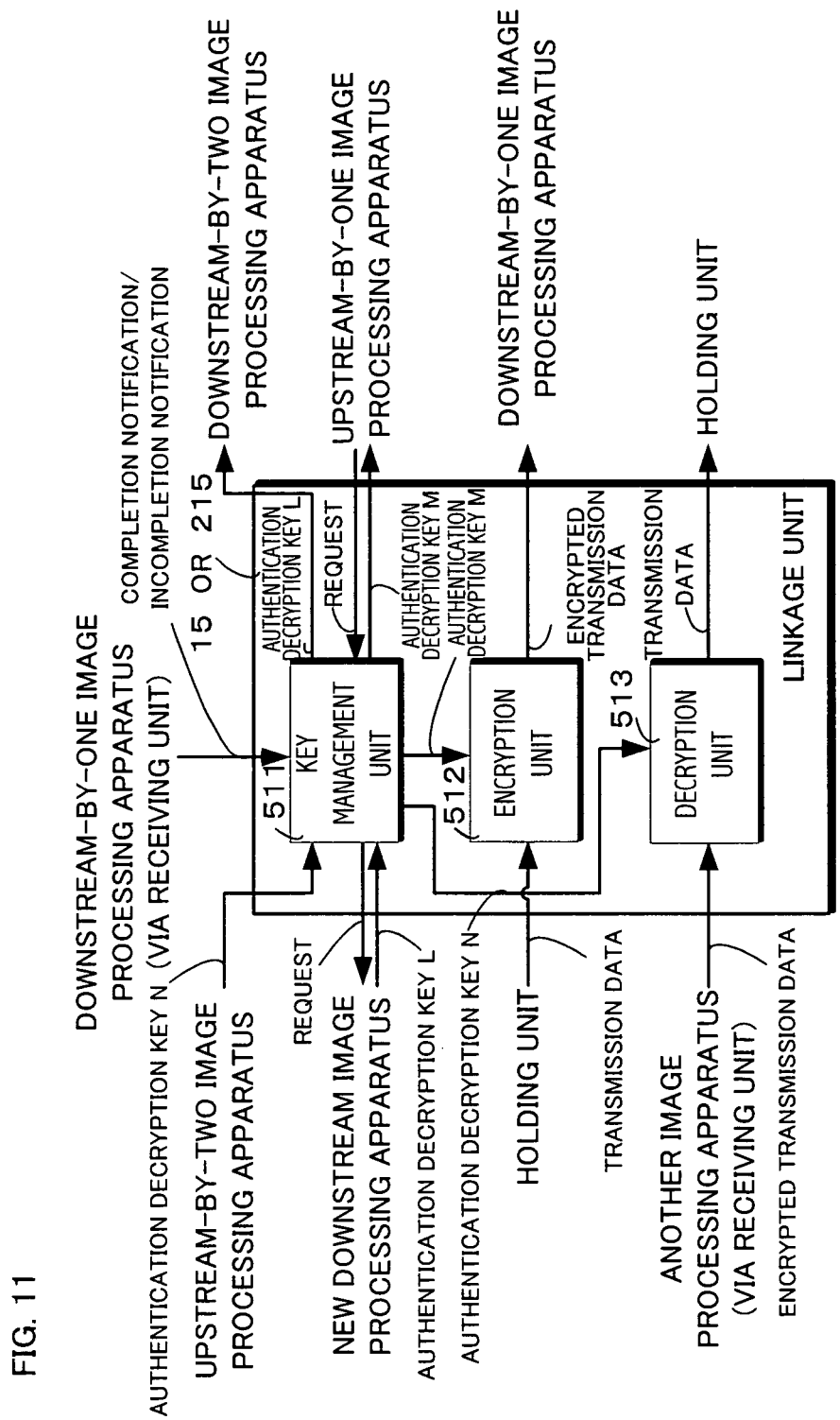
FIG. 11 shows a detailed construction of the linkage unit 15 of Embodiment 1 or the linkage unit 215 of Embodiment 2.

FIG. 11 shows a detailed construction of the linkage unit 15 of Embodiment 1 or the linkage unit 215 of Embodiment 2.

As shown in FIG. 11, the linkage unit 15 or 215 includes a key management unit 511, an encryption unit 512, and a decryption unit 513.

If a completion notification is not received from an apparatus that is downstream of the present apparatus by one, the key management unit 511 requests a distribution of an authentication decryption key to another apparatus (replacing apparatus) that can perform the job that has been assigned to the downstream-by-one apparatus, receives and transfers the authentication decryption key to an apparatus that is downstream of the present apparatus by two. If a completion notification is not received from an apparatus that is downstream of the present apparatus by one, the key management unit 511 also receives a request for distribution of an authentication decryption key from an apparatus that is upstream of the present apparatus by one, generates a pair of an authentication encryption key and an authentication decryption key, and distributes the authentication decryption key.

If the authentication decryption key is distributed to the apparatus that is upstream of the present apparatus by one, the encryption unit 512 encrypts part or all of data that is to be transmitted to an apparatus that is downstream of the present image processing apparatus by one, using the authentication encryption key generated by the key management unit 511.

If an authentication decryption key is distributed from an apparatus that is upstream of the present apparatus by two, in correspondence with an apparatus (replacing apparatus) that can perform a job that has been assigned to an apparatus that is upstream of the present apparatus by one, and if encrypted data, which has been encrypted using an authentication encryption key generated by the replacing apparatus itself, is received from the replacing apparatus, the decryption unit 513 decrypts the received encrypted data using the distributed authentication decryption key.

The linkage unit 25 or 225 includes a key management unit 521, an encryption unit 522, and a decryption unit 523. These components are the same as those with the same names of the linkage unit 15 or 215, and the description thereof is omitted here. The linkage unit 35 or 235 includes a key management unit 531, an encryption unit 532, and a decryption unit 533. These components are the same as those with the same names of the linkage unit 15 or 215, and the description thereof is omitted here.

The linkage unit 45 or 245 includes a key management unit 541, an encryption unit 542, and a decryption unit 543. These components are the same as those with the same names of the linkage unit 15 or 215, and the description thereof is omitted here.

<Operation>

Figure 12:
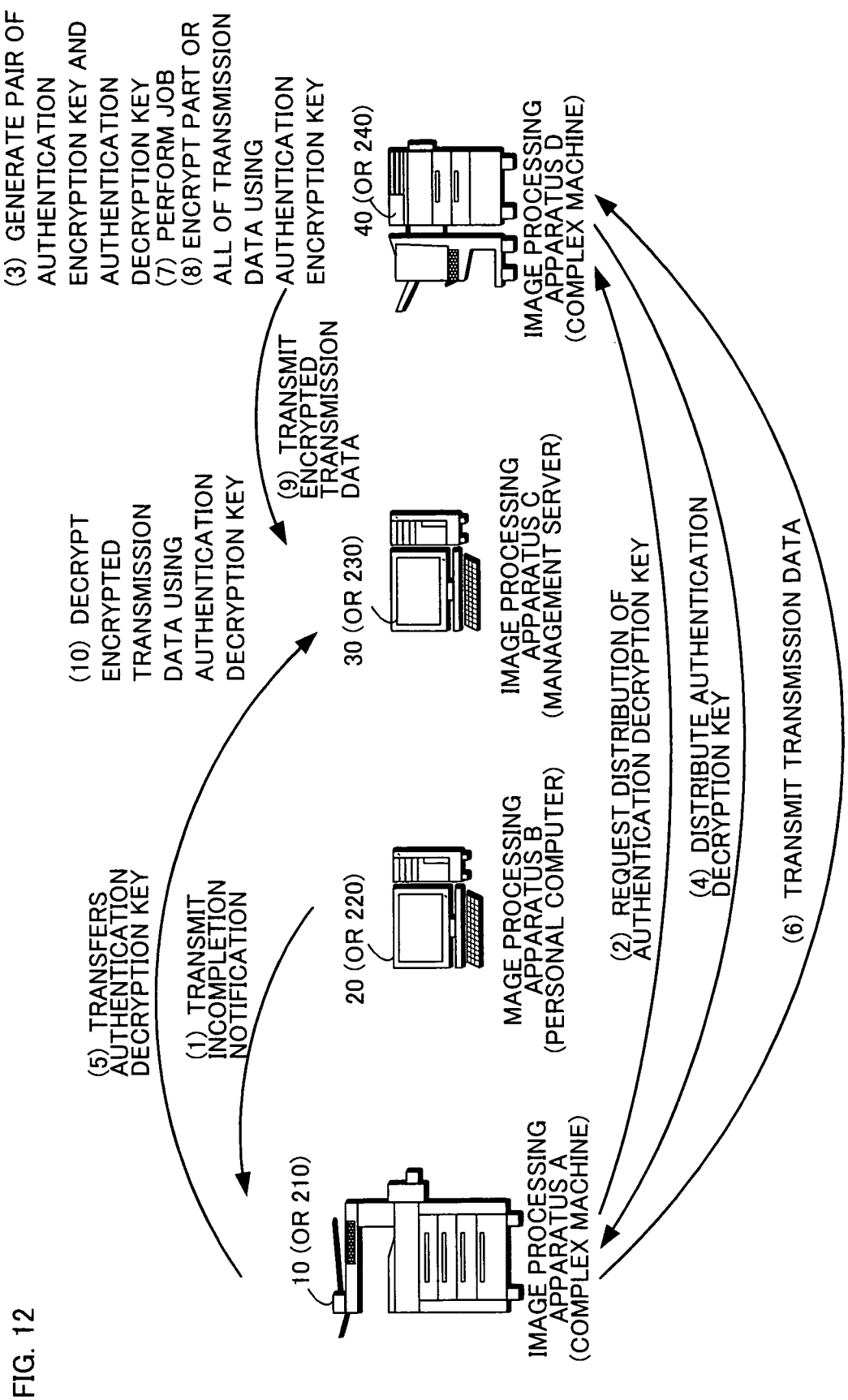
FIG. 12 shows an outline of an encryption process that is performed when an error occurs in Modification 3.

FIG. 12 shows an outline of an encryption process that is performed when an error occurs in Modification 3.

The following describes the outline of the encryption process performed after an error occurs, with reference to FIG. 12.

In the following description, as is the case with Modification 1, the workflow 1 shown in FIG. 2 is used, and it is presumed that an error occurs in the image processing apparatus B 20 or 220, the image processing apparatus D 40 or 240 performing the job in place of the image processing apparatus B 20 or 220.

(1) If the image processing apparatus B 20 or 220 fails to perform a job normally, it transmits an incompletion notification. The image processing apparatus A 10 or 210 receives the incompletion notification.

(2) The key management unit 511 of the image processing apparatus A 10 or 210 requests a distribution of an authentication decryption key to a new downstream image processing apparatus, the image processing apparatus D 40 or 240.

(3) The key management unit 541 of the image processing apparatus D 40 or 240 generates a pair of an authentication encryption key and an authentication decryption key.

(4) The image processing apparatus D 40 or 240 distributes the authentication decryption key to the image processing apparatus A 10 or 210.

(5) The image processing apparatus A 10 or 210 transfers the authentication decryption key to the image processing apparatus C 30 or 230.

(6) The image processing apparatus A 10 or 210 tries to continue to perform the job in the linkage process by transmitting data. The image processing apparatus D 40 or 240 receives the data.

(7) The image processing apparatus D 40 or 240 performs the job assigned to the apparatus D 40 or 240 itself.

(8) The image processing apparatus D 40 or 240 completes the job normally, then the encryption unit 542 encrypts part or all of data to be transmitted to the image processing apparatus C 30 or 230 that is downstream of the network image processing apparatus D 40 or 240 by one, using the authentication encryption key generated by the key management unit 541.

(9) The image processing apparatus D 40 or 240 tries to continue to perform the job in the linkage process by transmitting the data that has been partially or entirely encrypted. The image processing apparatus C 30 or 230 receives the encrypted data.

(10) The decryption unit 533 of the image processing apparatus C 30 or 230 decrypts the encrypted data using the authentication decryption key transferred from the image processing apparatus A 10 or 210. If the decryption unit 533 succeeds in the decryption, the image processing apparatus D 40 or 240 is judged to be an authorized apparatus, and the operation is continued to perform the subsequent processes. If the decryption unit 533 fails to decrypt the data normally or the data had not been encrypted in its entirety, the linkage process is stopped judging that the image processing apparatus D 40 or 240 is highly possible to be an unauthorized apparatus.

<Summary>

As described above, according to Modification 3 of the present invention, if an error occurs to any apparatus, encrypted data, which has been encrypted using an authentication encryption key received from the replacing apparatus, is decrypted using an authentication decryption key that is distributed from an apparatus that is upstream of the present apparatus by two. Only if the decryption is successfully performed, the job can be performed. This construction ensures a higher level of security in case an error occurs, and prevents occurrence of an unauthenticated act such as a spoofing, thus improving the security level efficiently.

In the above-described embodiments and modifications, when a same apparatus is to perform a plurality of works in succession, the plurality of works may be regarded and performed as one process, or may be dealt with in the same manner as works assigned to another apparatus. Also, if a work that is to be performed by an apparatus requires a plurality of licenses, resources or the like, these may be regarded as separate jobs and may be dealt with separately in units of function modules. For example, in Modification 2, if there are two works that are to be performed by a same apparatus, the apparatus may generate two different common keys and distribute the keys separately, in units of function modules.

A program, which can cause a computer to execute any one or more operations described in the above-described Embodiments 1-2 and Modification 1-3, may be recorded on a computer-readable recording medium, and the recording medium may be an object of distribution or business. The program itself also may be an object of distribution or business, for example, via a network, and may be displayed on a display apparatus, printed, or provided to users.

It should be noted here that the computer-readable recording medium may be an attachable/detachable recording medium such as a floppy disk, a CD, an MO, a DVD, or a memory card, or a fixed recording medium such as a hard disk or semiconductor memory, and is not limited to a specific recording medium.

INDUSTRIAL APPLICABILITY

The present invention is applicable to a system composed of a plurality of apparatuses that are connected to a network and perform jobs in cooperation in a linkage process. The present invention can improve convenience and security in case of error occurrence, and therefore has a high utility value in industry.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A network image processing system, including a plurality of apparatuses connected to a network, for performing jobs in a linkage process in which an upstream apparatus passes a workflow specifying a job to be completed, together with image data to be processed, to a downstream apparatus according to a procedure specified in the workflow, wherein
  the downstream apparatus comprising:
    a receiver that receives the workflow and the image data from the upstream apparatus;
  a processor that processes a predetermined job in the linkage process that is assigned to the downstream apparatus in accordance with the image data and the workflow received by the receiver;
    a completion notification transmitting unit that when the predetermined job has been processed completely by the downstream apparatus, transmits to the upstream apparatus a completion notification indicating that the predetermined job has been processed normally;
    a transmitter that, when the processing of the predetermined job by the processor has normally been completed and when there is a further apparatus which is positioned downstream of the downstream apparatus, transmits, to the further apparatus, the image data with which the predetermined job has been processed and the workflow received by the receiver, and
  the upstream apparatus comprising:
    a processor that processes another job in the linkage process that is assigned to the upstream apparatus;
    a transmitter that transmits the workflow and the image data to the downstream apparatus; and
    a linkage unit that if the completion notification is not received from the downstream apparatus in correspondence with the workflow and image data transmitted by the transmitter, updates the workflow to specify, as a new downstream apparatus, another apparatus among the plurality of apparatuses that is able to process the predetermined job, and passes, to the new downstream apparatus, the updated workflow together with the image data on which the another job has been processed, and wherein upon receiving the completion notification from the downstream apparatus or the new downstream apparatus, the linkage unit ends the linkage process for the upstream apparatus.

2. A network image processing system for performing jobs in a linkage process in which image data to be processed and an identification of a workflow, which specifies the jobs and a procedure for the jobs, are passed from an upstream apparatus to a downstream apparatus among a plurality of apparatuses, each including a processor and connected to a network, in accordance with the procedure specified by the workflow as the jobs are performed by the upstream apparatus and the downstream apparatus, each of the plurality of apparatuses storing therein a workflow, wherein the downstream apparatus comprises
    a processor that processes a predetermined job in the linkage process that is assigned to the downstream apparatus;
    a completion notification transmitting unit that when the predetermined job has been processed completely by the downstream apparatus, transmits to the upstream apparatus a completion notification indicating that the predetermined job has been processed normally; and
    a transmitter that, when the processing of the predetermined job by the processor has normally been completed and when there is a further apparatus which is positioned downstream of the downstream apparatus, transmits, to the further apparatus, the image data with which the predetermined job has been processed and the workflow, and
  the upstream apparatus comprises
    a processor that processes another job in the linkage process that is assigned to the upstream apparatus;
    a transmitter that, when the processing of the another job by the processor has normally been completed, transmits the workflow and the image data to the downstream apparatus; and
    a linkage unit that if the completion notification is not received from the downstream apparatus, updates workflows stored in all downstream apparatuses to specify, as a new downstream apparatus, another apparatus among the plurality of apparatuses connected to the network that can process the predetermined job, and the upstream apparatus passes, to the new downstream apparatus, the updated workflow together with the image data on which another predetermined job has been processed, and wherein upon receiving the completion notification from the downstream apparatus or the new downstream apparatus, the linkage unit ends the linkage process for the upstream apparatus.

3. A network image processing system composed of a plurality of apparatuses, each including a processor and, for performing predetermined jobs in a linkage process in accordance with a workflow that specifies the predetermined jobs and a procedure for the predetermined jobs, wherein each of the plurality of apparatuses comprise:
a job execution unit that executes a job among the predetermined jobs in the linkage process that is assigned to an apparatus including the job execution unit;
a management unit that monitors each job in terms of normal completion thereof, and judges whether there is a job that has not been completed normally; and
an assignment unit that if the management unit judges that there is a job that has not been completed normally, assigns the job to another one of the plurality of apparatuses that can perform the job;
a transmitter that, when the execution of the predetermined job by the job execution unit has normally been completed and when there is a further apparatus which is positioned downstream of the apparatus, transmits, to the further apparatus, the image data with which the predetermined job has been executed and the workflow, and wherein upon receiving a completion notification from a downstream apparatus, the linkage process ends for the apparatus, and
the network image processing system further comprises;
a control unit that passes, to the another apparatus, the image data on which the job has been processed and causes said another apparatus to perform the job.

4. A network image processing apparatus included in a network image processing system that includes a plurality of apparatuses connected to a network and performs jobs in a linkage process in which an upstream apparatus passes a workflow specifying a job to be completed, together with image data to be processed, to a downstream apparatus according to a procedure specified in the workflow, the network image processing apparatus comprising:
a receiver that receives a workflow and image data from an apparatus that is upstream of the network image processing apparatus;
a processing unit that processes a predetermined job in the linkage process that is assigned to the network image processing apparatus in correspondence with the workflow and the image data received by the receiver;
a transmitter that transmits the workflow and the image data after the predetermined job is processed by the processing unit, to an apparatus that is downstream of the network image processing apparatus;
a completion notification transmitting unit that when the predetermined job assigned to the network image processing apparatus has been processed completely, transmits, to the apparatus that is upstream of the network image processing apparatus, a completion notification indicating that the predetermined job has been processed normally; and
a linkage unit that if a completion notification is not received from the apparatus that is downstream of the network image processing apparatus, updates the workflow to specify, as a new downstream apparatus, another apparatus among the plurality of apparatuses connected to the network that can process the predetermined job, and passes, to the new downstream apparatus, the updated workflow together with the image data on which the another job has been processed, and wherein upon receiving the completion notification from the downstream apparatus or the new downstream apparatus, the linkage unit ends the linkage process for the upstream apparatus.

5. The network image processing apparatus of claim 4, wherein
if a completion notification is not received from the apparatus that is one apparatus downstream of the network image processing apparatus, the linkage unit searches for an apparatus that can process said another predetermined job at a current point in time.

6. The network image processing apparatus of claim 4, wherein
if a completion notification is not received from the apparatus that is one apparatus downstream of the network image processing apparatus, the linkage unit notifies a new apparatus that is two apparatuses downstream of the network image processing apparatus that the new downstream apparatus will receive said another predetermined job.

7. The network image processing apparatus of claim 6, wherein
when notifying that the new downstream apparatus will receive said another predetermined job, the linkage unit uses encryption.

8. The network image processing apparatus of claim 4, wherein
if a completion notification is not received from the apparatus that is one apparatus downstream of the network image processing apparatus, the linkage unit continues the linkage process in a high secure mode that has a higher security level than a normal security level of a normal secure mode.

9. The network image processing apparatus of claim 8, wherein in the high secure mode, encryption is used in transmission and reception of data.

10. The network image processing apparatus of claim 4, wherein
the linkage unit further includes:
a key management unit that if a completion notification is not received from the apparatus that is one apparatus downstream of the network image processing apparatus, distributes a common key to an apparatus that is two apparatuses downstream of the network image processing apparatus, and to the new downstream apparatus;
an encryption unit that if a common key is distributed from the apparatus that is one apparatus upstream of the network image processing apparatus, encrypts, using the common key, part or all of data that is to be transmitted to the apparatus that is one apparatus downstream of the network image processing apparatus; and
a decryption unit that if a common key is distributed from an apparatus that is two apparatuses upstream of the network image processing apparatus, and if encrypted data is received from an apparatus that can perform a job assigned to the apparatus that is one apparatus upstream of the network image processing apparatus, decrypts the encrypted data using the common key.

11. The network image processing apparatus of claim 4, wherein
the linkage unit further includes:
a key management unit that if a job that has been assigned in advance or is newly assigned to the network image processing apparatus cannot be performed, generates a common key and distributes the common key to the apparatus that is one apparatus upstream of the network image processing apparatus and to the apparatus that is one apparatus downstream of the network image processing apparatus, and if a completion notification is not received from the apparatus that is one apparatus downstream of the network image processing apparatus, is distributed a common key from the apparatus that is one apparatus downstream of the network image processing apparatus, and transfers the distributed common key to the new downstream apparatus;

an encryption unit that if a common key is distributed from the apparatus that is one apparatus upstream of the network image processing apparatus, encrypts, using the common key, part or all of data that is to be transmitted to the apparatus that is one apparatus downstream of the network image processing apparatus; and a decryption unit that if a common key is distributed from the apparatus that is one apparatus upstream of the network image processing apparatus, and if encrypted data is received from an apparatus that can perform a job assigned to the apparatus that is one apparatus upstream of the network image processing apparatus, decrypts the encrypted data using the common key.

12. The network image processing apparatus of claim 4, wherein the linkage unit further includes:

a key management unit that if a completion notification is not received from the apparatus that is one apparatus downstream of the network image processing apparatus, is distributed an authentication decryption key from the new downstream apparatus, and transfers the authentication decryption key to an apparatus that is two apparatuses downstream of the network image processing apparatus;

an encryption unit that if an authentication decryption key of the network image processing apparatus has been transmitted to the apparatus that is one apparatus upstream of the network image processing apparatus, encrypts part or all of data that is to be transmitted to the apparatus that is one apparatus downstream of the network image processing apparatus, using the authentication decryption key of the network image processing apparatus; and a decryption unit that if an authentication decryption key of an apparatus that can perform a job assigned to the apparatus that is one apparatus upstream of the network image processing apparatus is distributed from an apparatus that is two apparatuses upstream of the network image processing apparatus, and if encrypted data, which was generated by encrypting data using the authentication decryption key of the apparatus that can perform the job, decrypts the encrypted data using the authentication decryption key.

13. A network image processing apparatus included in a network image processing system for performing jobs in a linkage process in which image data to be processed and an identification of a workflow, which specifies the jobs and a procedure for the jobs, are passed from an upstream apparatus to a downstream apparatus among a plurality of apparatuses connected to a network, in accordance with the procedure specified by the workflow as the jobs are performed by the upstream apparatus and the downstream apparatus, each of the plurality of apparatuses storing therein a workflow, the network image processing apparatus comprising:

a receiver that receives a workflow and image data from an apparatus that is upstream of the network image processing apparatus;

a processing unit that processes a predetermined job in the linkage process that is assigned to the network image processing apparatus in correspondence with the workflow and the image data received by the receiver;

a transmitter that transmits the workflow and the image data after the predetermined job is processed by the processing unit, to an apparatus that is downstream of the network image processing apparatus;

a completion notification transmitting unit that when the predetermined job assigned to the network image processing apparatus has been processed completely, transmits, to the apparatus that is upstream of the network image processing apparatus, a completion notification indicating that the predetermined job has been processed normally, and a linkage unit that if a completion notification is not received from the apparatus that is downstream of the network image processing apparatus, in terms of another predetermined job in the linkage process that is specified by a workflow with an identifier that is passed from the apparatus that is upstream of the network image processing apparatus, updates workflows stored in all downstream apparatuses to specify, as a new downstream apparatus, another apparatus among the plurality of apparatuses connected to the network that can process said another predetermined job, and passes, to the new downstream apparatus, the updated workflow together with the image data on which the another job has been processed, and wherein upon receiving a completion notification from the downstream apparatus or the new downstream apparatus, the linkage unit ends the linkage process for the upstream apparatus.

14. The network image processing apparatus of claim 13, wherein if a completion notification is not received from the apparatus that is one apparatus downstream of the network image processing apparatus, the linkage unit searches for an apparatus that can process said another predetermined job at a current point in time.

15. The network image processing apparatus of claim 13, wherein if a completion notification is not received from the apparatus that is one apparatus downstream of the network image processing apparatus, the linkage unit notifies an apparatus that is two apparatuses downstream of the network image processing apparatus that the new downstream apparatus will receive said another predetermined job.

16. The network image processing apparatus of claim 15, wherein when notifying that the new downstream apparatus will receive said another predetermined job, the linkage unit uses encryption.

17. The network image processing apparatus of claim 13, wherein if a completion notification is not received from the apparatus that is one apparatus downstream of the network image processing apparatus, the linkage unit continues the linkage process in a high secure mode that has a higher security level than a normal security level of a normal secure mode.

18. The network image processing apparatus of claim 17, wherein in the high secure mode, encryption is used in transmission and reception of data.

19. The network image processing apparatus of claim 13, wherein the linkage unit further includes:

a key management unit that if a completion notification is not received from the apparatus that is one apparatus downstream of the network image processing apparatus, distributes a common key to an apparatus that is two apparatuses downstream of the network image processing apparatus, and to the new downstream apparatus;

an encryption unit that if a common key is distributed from the apparatus that is one apparatus upstream of the network image processing apparatus, encrypts part or all of data that is to be transmitted to the apparatus that is one apparatus downstream of the network image processing apparatus; and a decryption unit that if a common key is distributed from an apparatus that is two apparatuses upstream of the network image processing apparatus, and if encrypted data is received from an apparatus that can perform a job assigned to the apparatus that is one apparatus upstream of the network image processing apparatus, decrypts the encrypted data using the common key.

20. The network image processing apparatus of claim 13, wherein the linkage unit further includes:

a key management unit that if a job that has been assigned in advance or is newly assigned to the network image processing apparatus cannot be performed, generates a common key and distributes the common key to the apparatus that is one apparatus upstream of the network image processing apparatus and to the apparatus that is one apparatus downstream of the network image processing apparatus, and if a completion notification is not received from the apparatus that is one apparatus downstream of the network image processing apparatus, is distributed a common key from the apparatus that is one apparatus downstream of the network image processing apparatus, and transfers the distributed common key to the new downstream apparatus;

an encryption unit that if a common key is distributed from the apparatus that is one apparatus upstream of the network image processing apparatus, encrypts part or all of data that is to be transmitted to the apparatus that is one apparatus downstream of the network image processing apparatus; and a decryption unit that if a common key is distributed from the apparatus that is one apparatus upstream of the network image processing apparatus, and if encrypted data is received from an apparatus that can perform a job assigned to the apparatus that is one apparatus upstream of the network image processing apparatus, decrypts the encrypted data using the common key.

21. The network image processing apparatus of claim 13, wherein the linkage unit further includes:

a key management unit that if a completion notification is not received from the apparatus that is one apparatus downstream of the network image processing apparatus, is distributed an authentication decryption key from the new downstream apparatus, and transfers the authentication decryption key to an apparatus that is two apparatuses downstream of the network image processing apparatus;

an encryption unit that if an authentication decryption key of the network image processing apparatus has been transmitted to the apparatus that is one apparatus upstream of the network image processing apparatus, encrypts part or all of data that is to be transmitted to the apparatus that is one apparatus downstream of the network image processing apparatus, using the authentication decryption key of the network image processing apparatus; and a decryption unit that if an authentication decryption key of an apparatus that can perform a job assigned to the apparatus that is one apparatus upstream of the network image processing apparatus is distributed from an apparatus that is two apparatuses upstream of the network image processing apparatus, and if encrypted data, which was generated by encrypting data using the authentication decryption key of the apparatus that can perform the job, is received from the apparatus that can perform the job, decrypts the encrypted data using the authentication decryption key.

22. A network image processing apparatus included in a network image processing system for performing a linkage process based on a workflow that specifies predetermined jobs and a procedure for the predetermined jobs, the network image processing apparatus comprising:

a processor that processes a job in the linkage process that is assigned to the network image processing apparatus;

a management unit that monitors each job in the linkage process in terms of normal completion thereof, and judges whether there is a job that has not been completed normally; and a control unit that if the management unit judges that there is a job that has not been completed normally, assigns the job to another network image processing apparatus that can perform the job, and passes, to the another network image processing apparatus, the image data on which the job has been processed; and a transmitter that, when the processing of the job by the processor has normally been completed and when there is a further apparatus which is positioned downstream of the network image processing apparatus, transmits, to the further apparatus, the image data with which the job has been processed and the workflow, and wherein upon receiving a completion notification from a downstream network image processing apparatus, the linkage process ends for the network image processing apparatus.

23. A network image processing method for a network image processing system that includes a plurality of apparatuses, each including a processor and connected to a network and performs jobs in a linkage process in which an upstream apparatus passes a workflow specifying a job to be completed, together with image data to be processed, to a downstream apparatus according to a procedure specified in the workflow, the network image processing method comprising:

a receiving step that causes a network image processing apparatus included in the network image processing system to receive a workflow and image data from an apparatus that is upstream of the network image processing apparatus;

a processing step that causes the network image processing apparatus to process a predetermined job in the linkage process that is assigned to the network image processing apparatus in correspondence with the workflow and the image data received in the receiving step;

a transmitting step that causes the network image processing apparatus to transmit the workflow and the image data after the predetermined job is processed in the processing step, to an apparatus that is downstream of the network image processing apparatus;

a completion notification transmitting step that when the predetermined job assigned to the network image processing apparatus has been processed completely, transmits, to the apparatus that is upstream of the network image processing apparatus, a completion notification indicating that the predetermined job has been processed normally; and a linkage step that if a completion notification is not received from the apparatus that is downstream of the network image processing apparatus another apparatus among the plurality of apparatuses connected to the network that can process the predetermined job, and passes, to the new downstream apparatus, the updated workflow together with the image data on which the another job has been processed, and wherein upon receiving the completion notification from the downstream apparatus or the new downstream apparatus, the linkage process ends for the upstream apparatus.

24. A network image processing method for a network image processing system for performing jobs in a linkage process in which image data to be processed and an identification of a workflow, which specifies the jobs and a procedure for the jobs, are passed from an upstream apparatus to a downstream apparatus among a plurality of apparatuses each including a processor and connected to a network, in accordance with the procedure specified by the workflow as the job is performed by the upstream apparatus and the downstream apparatus, each of the plurality of apparatuses storing therein a workflow, the network image processing method comprising:
- a receiving step that causes a network image processing apparatus included in the network image processing system to receive a workflow and image data from an apparatus that is upstream of the network image processing apparatus;
- a processing step that causes the network image processing apparatus to process a predetermined job in the linkage process that is assigned to the network image processing apparatus in correspondence with the workflow and the image data received in the receiving step;
- a transmitting step that causes the network image processing apparatus to transmit the workflow and the image data after the predetermined job is processed in the processing step, to an apparatus that is downstream of the network image processing apparatus;
- a completion notification transmitting step that when the predetermined job assigned to the network image processing apparatus has been processed completely, transmits, to the apparatus that is upstream of the network image processing apparatus, a completion notification indicating that the predetermined job has been processed normally, and
- a linkage step that if a completion notification is not received from the apparatus that is downstream of the network image processing apparatus, updates workflows stored in all downstream apparatuses to specify, as a new downstream apparatus, another apparatus among the plurality of apparatuses connected to the network that can process the predetermined job, and passes, to the new downstream apparatus, the updated workflow together with the image data on which the another job has been processed, and wherein upon receiving a completion notification from the downstream apparatus or the new downstream apparatus, the linkage process ends for the upstream apparatus.

25. A network image processing method for a network image processing system including a plurality of apparatuses for performing predetermined jobs in a linkage process in accordance with a workflow that specifies the predetermined jobs and a procedure for the predetermined jobs, wherein each of the plurality of apparatuses include a processor and comprise:
- a job execution unit that executes a job among the predetermined jobs in the linkage process that is assigned to an apparatus including the job execution unit; and
- a transmitter that, when the executing of the job among the predetermined jobs by the processor has normally been completed and when there is a further apparatus which is positioned downstream of the apparatus including the job execution unit, transmits, to the further apparatus, image data with which the job has been executed and the workflow, and the network image processing method comprises:
- a management step that, in each of the plurality of apparatuses checks on each job in terms of normal completion thereof, and judges whether there is a job that has not been completed normally;
- a control step that, in each of the plurality of apparatuses, if the management step judges that there is a job that has not been completed normally, assigns the job to another one of the plurality of apparatuses that can perform the job, and passes, to the another one of the plurality of apparatuses, the image data on which the job has been processed; and
- a transmitting step that, in each of the plurality of apparatuses, when the execution of the job among the predetermined jobs by the job execution unit has normally been completed and when there is a further apparatus which is positioned downstream of the apparatus including the job execution unit, transmits, to the further apparatus, the image data with which the job among the predetermined jobs has been executed and the workflow, and wherein upon receiving a completion notification from a downstream apparatus, the linkage process ends for the apparatus.

* * * * *